US011975912B2

(12) United States Patent
Morrison

(10) Patent No.: US 11,975,912 B2
(45) Date of Patent: May 7, 2024

(54) LOCKING SPRAY NOZZLE

(71) Applicant: RUST-OLEUM CORPORATION, Vernon Hills, IL (US)

(72) Inventor: Adam Peter Morrison, Vernon Hills, IL (US)

(73) Assignee: RUST-OLEUM CORPORATION, Vernon Hills, IL (US)

( * ) Notice: Subject to any disclaimer, the term of this patent is extended or adjusted under 35 U.S.C. 154(b) by 0 days.

(21) Appl. No.: 17/801,177

(22) PCT Filed: Nov. 9, 2021

(86) PCT No.: PCT/US2021/058609
§ 371 (c)(1),
(2) Date: Aug. 19, 2022

(87) PCT Pub. No.: WO2022/099191
PCT Pub. Date: May 12, 2022

(65) Prior Publication Data

US 2023/0062171 A1 Mar. 2, 2023

Related U.S. Application Data

(60) Provisional application No. 63/111,439, filed on Nov. 9, 2020.

(51) Int. Cl.
*B05B 1/16* (2006.01)
*B65D 83/20* (2006.01)
*B65D 83/56* (2006.01)

(52) U.S. Cl.
CPC ............ *B65D 83/56* (2013.01); *B05B 1/1654* (2013.01); *B65D 83/206* (2013.01)

(58) Field of Classification Search
CPC .... B05B 1/1654; B65D 83/56; B65D 83/206; B65D 83/22
See application file for complete search history.

(56) References Cited

U.S. PATENT DOCUMENTS

| | | | |
|---|---|---|---|
| 2,797,965 | A | 7/1957 | McKernan |
| 2,997,243 | A | 8/1961 | Kolb |
| 3,083,872 | A | 4/1963 | Meshberg |
| 3,176,888 | A | 4/1965 | Focht |
| 3,180,536 | A | 4/1965 | Meshberg |
| 3,246,850 | A | 4/1966 | Bourke |
| 3,703,994 | A | 11/1972 | Nigro |
| 3,711,030 | A | 1/1973 | Jones |

(Continued)

OTHER PUBLICATIONS

ISA/US, PCT/US2021/058609, PCT Search Report and Written Opinion dated Jan. 31, 2022, Harry Kim (8 pages).

*Primary Examiner* — Steven M Cernoch
(74) *Attorney, Agent, or Firm* — Crawford Maunu PLLC

(57) ABSTRACT

Aspects of the disclosure are directed to methods and/or apparatuses involving an apparatus having a channel, an actuator, a mechanical stop, and a dial having nozzles and a gear. The dial is operable to rotate for selectively aligning each of the respective nozzles with the channel. The gear has a plurality of cogs and recessed regions between adjacent ones of the cogs, and is configured with the mechanical stop to prevent movement of the actuator when the dial is positioned such that none of the nozzles are aligned with the channel.

20 Claims, 27 Drawing Sheets

(56) References Cited

U.S. PATENT DOCUMENTS

| | | | | |
|---|---|---|---|---|
| 3,795,366 | A * | 3/1974 | McGhie | B65D 83/7532 222/402.11 |
| 3,913,804 | A | 10/1975 | Laauwe | |
| 5,385,303 | A | 1/1995 | Gosselin et al. | |
| 5,901,907 | A | 5/1999 | Hildebrandt | |
| 7,621,468 | B2 | 11/2009 | Smith et al. | |
| 8,201,757 | B2 | 6/2012 | Suzuki | |
| 8,701,944 | B2 | 4/2014 | Tryon | |
| 9,126,212 | B2 | 9/2015 | Pirshafiey | |
| 9,156,042 | B2 | 10/2015 | Handson et al. | |
| 9,248,457 | B2 | 2/2016 | Handson et al. | |
| 9,957,100 | B2 | 5/2018 | Jasper | |
| 2005/0274826 | A1 | 12/2005 | Chen | |
| 2008/0017672 | A1 | 1/2008 | Ohshima | |
| 2008/0190968 | A1 | 8/2008 | Heirman | |
| 2010/0044400 | A1 | 2/2010 | Laidler | |
| 2010/0219211 | A1 | 9/2010 | Smith et al. | |
| 2010/0301130 | A1 | 12/2010 | Townsend | |
| 2011/0114756 | A1 | 5/2011 | Munn | |
| 2014/0306032 | A1 | 10/2014 | Su et al. | |

* cited by examiner

LOCKING SPRAY NOZZLE

BACKGROUND

Liquid spray dispensers, such as aerosol dispensers, can be utilized in a variety of applications. For instance, aerosol spray cans can be used to dispense coatings such as paint, household cleaners, industrial products, personal care products, agricultural products, and insect repellants. Aerosol spray cans may utilize a propellant to propel liquid through a nozzle, in response to actuation of a valve that results in pressurized liquid being propelled out of the spray can. For instance, a trigger or other mechanism may be used to actuate the valve, with liquid in the can being propelled through a nozzle.

While useful for a variety of applications, aerosol dispensers may suffer from leakage and/or inadvertent dispensing. For instance, triggers may inadvertently be actuated when handling or transporting aerosol spray paint cans, resulting in unwanted dispensing of paint. Further, many such dispensers are limited in the manner in which liquid is dispensed, for example such as limiting a pattern in which paint is sprayed from an aerosol spray paint can.

These and other matters have presented challenges to the manufacture and implementation of liquid spray dispensers, for a variety of applications.

SUMMARY

Various example embodiments are directed to locking spray nozzle apparatuses and methods, which may address various challenges including those noted above.

As may be implemented in accordance with one or more embodiments, an apparatus includes a channel, an actuator, a mechanical stop, and a dial having nozzles and a gear. The dial is operable to rotate for selectively aligning each of the respective nozzles with the channel. The gear has a plurality of cogs and recessed regions between adjacent ones of the cogs, and is configured and arranged with the mechanical stop to prevent movement of the actuator when the dial is positioned with the nozzles out of alignment with the channel. Such an apparatus may be useful, for example, to prevent unintentional actuation and therein prevent unintentional dispensing of fluid via the nozzles.

Another embodiment is directed to an apparatus having a liquid supply channel, a rotatable dial, an actuator and a locking mechanism. The rotatable dial has a plurality of nozzles, separated from one another by a portion of the rotatable dial. The rotatable dial is further configured to selectively align each of the respective nozzles with the channel for receiving and spraying propelled liquid received via the channel. The actuator is configured and arranged to release the propelled liquid into the channel by actuating a valve. The locking mechanism is configured with the rotatable dial to, in response to the rotatable dial being positioned with the nozzles out of alignment with the channel, prevent actuation of the valve and block delivery of the propelled liquid to the channel by preventing movement of the actuator. The locking mechanism is further configured with the rotatable dial to, in response to the rotatable dial being positioned with one of the nozzles aligned with the channel, facilitate movement of the actuator for actuating the valve and delivering the propelled liquid to the one of the nozzles via the channel.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description and in connection with the accompanying drawings, in which.

Figure 1:
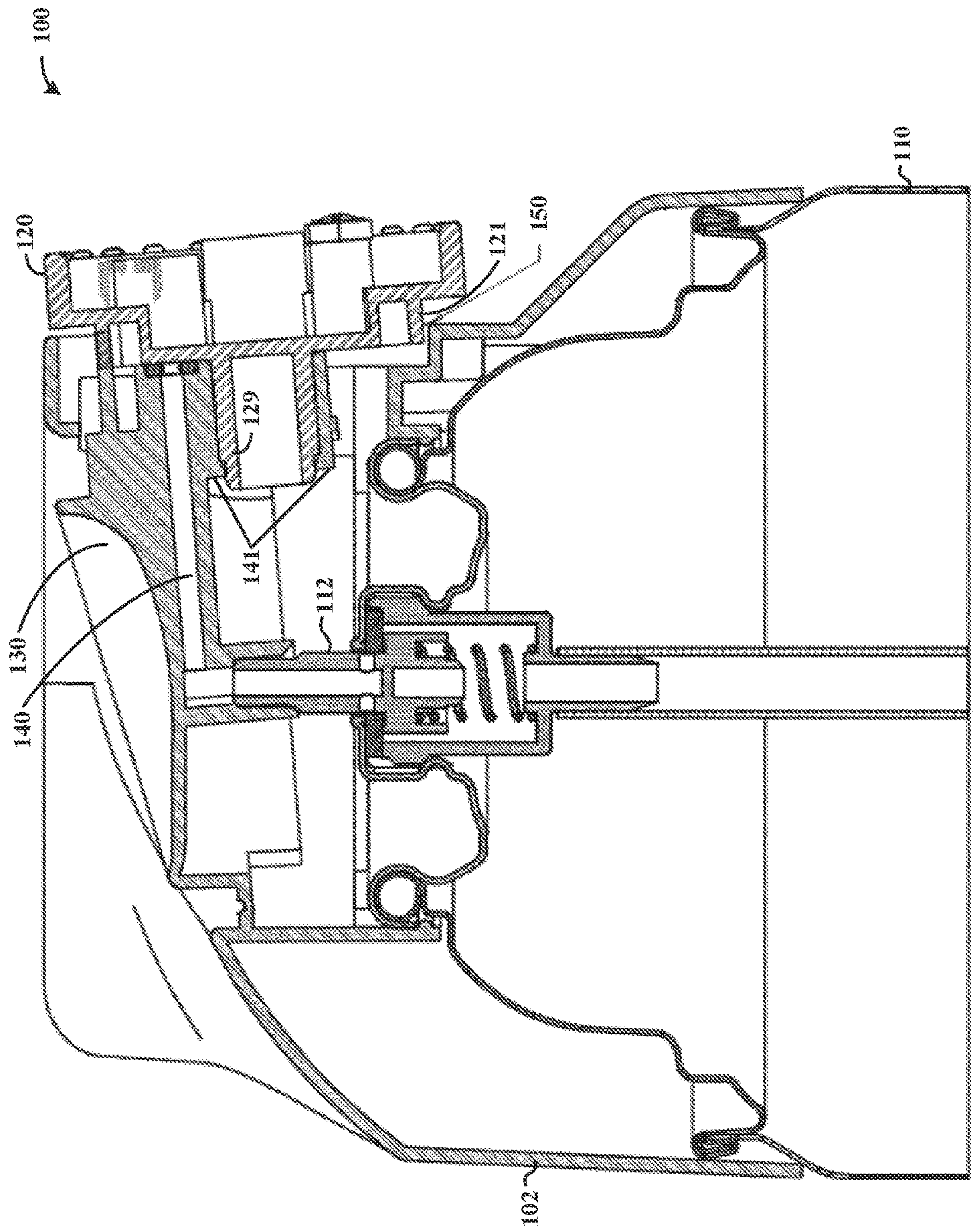
FIG. 1 shows a cross sectional view of an apparatus having a rotatable spray nozzle dial with multiple apertures and a corresponding locking mechanism, with the apparatus in a locked position and coupled to an aerosol can, as may be implemented in accordance with various embodiments.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims.

DETAILED DESCRIPTION

Aspects of the present disclosure are believed to be applicable to a variety of different types of apparatuses, systems and methods involving dispensing of liquid, such as for dispensing aerosols from pressurized containers. Various embodiments are directed to an apparatus having selectable nozzle apertures and a related locking (or blocking) mechanism that operates to lock and unlock the apparatus for spraying applications. In particular embodiments, a rotatable dial has multiple nozzles and features/cogs that operate to limit or prevent actuation of a trigger mechanism to positions in which the nozzles are aligned for dispensing liquid. While not necessarily so limited, embodiments are characterized in this context.

In a particular embodiment, an aerosol spray cap has multiple spray nozzles coupled to a rotatable structure such as a dial or disk. The rotatable structure operates to selectively align each of the spray nozzles to a channel for receiving and spraying propelled liquid. The spray cap includes an actuator such as a trigger or button coupled to move with the rotatable structure, and which operates to dispense propelled liquid when actuated. The rotatable structure and body of the spray cap have mechanical features that interact to limit movement of the actuator such that the propelled liquid is prevented from being dispensed when one of the spray nozzles is not aligned to the channel.

For instance, the disk may employ a gear and tooth mechanism with gears aligned with the nozzles and a tooth on the cap such that the actuator is allowed to move when one of the gears is aligned to mesh with one of the teeth. The gear is configured relative to the nozzles such that such alignment occurs only when one of the nozzles are aligned to the channel. For positions in which one of the nozzles is not so aligned to the channel, the gear does not mesh with the tooth, and the tooth prevents movement of the gear (and actuator) in a direction toward the tooth. Such a position may effect an "off" or "shipping" position in which the spray cap is inoperable for dispensing liquid.

In a particular embodiment, the spray nozzles are located at respective angular positions around the rotating structure, with a gap between the spray nozzles. The mechanical features may be located such that movement of the actuator is limited when the rotating structure is rotated so that a position between two of the nozzles is aligned with the channel, and such that the actuator is allowed to dispense the propelled liquid when one of the nozzles is aligned to the channel. In this context, the propelled liquid may thus be dispensed via movement of the actuator (and rotatable structure) only when one of the nozzles is aligned to the channel.

In some embodiments, the actuator button may be pivoted from a location opposite to the location of the disk (relative to the actuator button). Pivoting the actuator button may also result actuation of the disk, such as by depressing the disk vertically and/or pivoting the disk. As such, when one of the nozzles is aligned to the channel and force is applied to the actuator, propelled liquid may be dispensed through one of the nozzles. When the disk is rotated such that a position between the nozzles is aligned to the channel, the disk prevents pivoting of the actuator and depression of the disk, preventing dispensing of the propelled liquid. For instance, when coupled to a spray canister such as a spray paint can having a valve, the actuator may be implemented as a button that, when actuated, opens the valve and allows fluid from the spray canister to spray through the channel to a nozzle in the disk that is aligned to the channel.

Another embodiment is directed to an apparatus having a liquid supply channel, a rotatable dial, an actuator and a locking mechanism. The rotatable dial has a plurality of nozzles, separated from one another by a portion of the rotatable dial, and is operable to align each of the respective nozzles with the channel for receiving and spraying propelled liquid received via the channel. For instance, the apparatus may include a sleeve coupled to the channel and actuator, with the rotatable dial having a shaft coupled to the sleeve and configured to rotate within the sleeve. The actuator is operable to release the propelled liquid into the channel by actuating a valve. The locking mechanism operates with the rotatable dial to prevent actuation of the valve and block delivery of the propelled liquid to the channel, by preventing movement of the actuator when the rotatable dial is positioned so that the nozzles are not aligned with the channel. The locking mechanism further operates with the rotatable dial to allow the actuator to move for actuating the valve and delivering the propelled liquid to the one of the nozzles via the channel, when the rotatable dial is positioned with one of the nozzles aligned with the channel. Accordingly, the locking mechanism may operate to prevent unwanted dispensing of liquid, for instance while rotating the dial for aligning a nozzle having a particular size or while stored or shipped.

The actuator may be implemented in a variety of manners. In some embodiments, the actuator includes a button mechanism, such as a spray button for a spray can, which opens the valve when depressed with the rotatable dial positioned such that one of the nozzles is aligned with the channel. The locking mechanism thus facilitates the movement of the actuator when the nozzle is so aligned. The button mechanism, dial and channel may be coupled and move together in response to depression of the button. In certain implementations, a pivot structure is coupled to the button mechanism and operates to facilitate movement of the actuator by pivoting the button mechanism about the pivot structure, therein actuating the dial and channel (e.g., downward to dispense propelled liquid from a canister).

In some embodiments, the locking mechanism includes a mechanical stop and a gear coupled to rotate with the dial (or the gear may be part of the dial). The gear has cogs and recessed regions between the cogs located relative to the nozzles and the mechanical stop, so that one of the cogs is aligned to the mechanical stop and prevents the button from pivoting to actuate the valve when the rotatable dial is positioned with the nozzles out of alignment with the channel. When the rotatable dial is positioned with one of the nozzles aligned with the channel, one of the recessed regions is aligned for meshing with the mechanical stop, which allows the button to pivot about the pivot structure and actuate the valve for delivering the propelled liquid to the one of the nozzles via the channel.

The cogs may include a cog corresponding to each space between adjacent ones of the nozzles, such that one of the cogs is aligned to the mechanical stop at all instances in which space between any adjacent ones of the nozzles is aligned to the channel. One of the recessed regions may further be aligned to mesh with the mechanical stop for allowing movement of the button for actuating the valve at all instances in which one of the nozzles is aligned to the channel.

In certain implementations, the locking mechanism includes a mechanical stop and a gear coupled to rotate with the dial. The gear operates with the mechanical stop to prevent actuation of the actuator when the nozzles are not aligned to the channel. The gear may include a recessed region configured to mesh with the mechanical stop. Further, the locking mechanism may include a pivot arm coupled to the actuator. The pivot arm operates with the cog and gear to actuate the valve when the recessed region is meshed with the mechanical stop.

The apparatus may include the valve and a liquid container coupled to the valve. The liquid supply channel, rotatable dial, actuator and locking mechanism may be part of a cap coupled to the container. The cap may operate to spray liquid from the container through one of the nozzles in response to the actuator being depressed, when the nozzle is aligned to the channel, by actuating the valve and therein causing the container to propel liquid through the valve, channel and nozzle.

The button may be coupled to a pivot and further be operable to actuate the valve in response to force applied to the button that causes the button to pivot and depress the channel, dial and valve vertically. This depression causes the propelled liquid to be dispensed when the rotatable dial is positioned with one of the nozzles aligned with the channel.

In certain embodiments, the channel, dial and actuator may be coupled to a pivot and operable to actuate the valve in response to force applied to the actuator, which causes the channel, dial and actuator to rotate about the pivot when the rotatable dial is positioned with one of the nozzles aligned with the channel.

Another embodiment is directed toward a nozzle apparatus having a channel, an actuator, a mechanical stop, and a dial having nozzles and a gear. The dial is operable to rotate for selectively aligning each of the respective nozzles with the channel. The gear has a plurality of cogs and recessed regions between adjacent ones of the cogs, and operates with the mechanical stop to prevent movement of the actuator when the dial is positioned such that none of the nozzles are aligned with the channel. For instance, the gear may be operable to mesh one of the recessed regions with the mechanical stop to facilitate movement of the actuator when the dial is positioned with one of the nozzles aligned with the channel. Such an apparatus may be useful, for example, to prevent unintentional actuation and therein prevent unintentional dispensing of fluid via the nozzles.

The nozzle apparatus may be implemented in a variety of manners. For instance, the cogs may be aligned relative to the nozzles so that one of the recessed regions is aligned to mesh with the mechanical stop and therein facilitate movement of the actuator, when one of the nozzles is aligned to the channel. When none of the nozzles are aligned to the channel, one of the cogs is aligned to engage with the mechanical stop and therein prevent movement of the actuator. The actuator may include a button that is part of a pivot arm coupled to a pivot point, with the pivot arm being operable to pivot about the pivot point in response to pressure applied to the button when one of the recessed regions is aligned to mesh with the mechanical stop. This pivoting may cause movement of the actuator such that the dial moves vertically which opens a valve for dispensing propelled liquid. The nozzle apparatus may include a fluid container and such a valve coupled to the actuator for dispensing fluid from the container into the channel, in response to movement of the actuator. For instance, paint may be dispensed from the fluid container, in response to depression of a button as noted above, which causes downward movement of the actuator and opens the valve.

In a more particular embodiment, the dial of the nozzle apparatus operates to selectively align each of the respective nozzles with the channel for receiving and spraying propelled liquid received via the channel. The actuator operates to release the propelled liquid into the channel by actuating a valve. The gear and mechanical stop form a locking mechanism that operates with the dial to prevent actuation of the valve and block delivery of the propelled liquid to the channel, by preventing movement of the actuator when the dial is positioned with the nozzles out of alignment with the channel. The locking mechanism further operates to facilitate movement of the actuator to actuate the valve and deliver the propelled liquid to the one of the nozzles via the channel, when the dial is positioned with one of the nozzles aligned with the channel.

Figure 2:
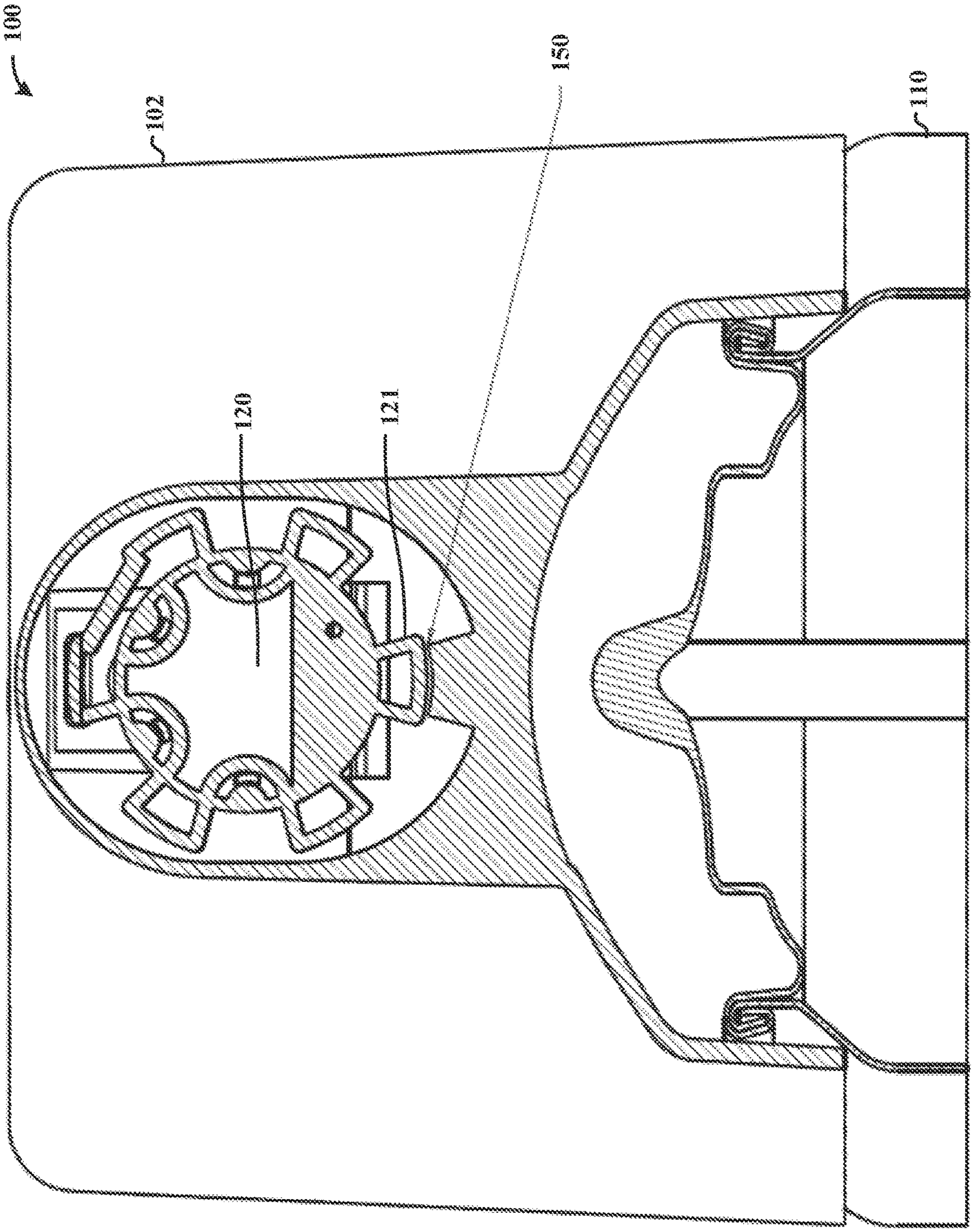
FIG. 2 shows a cross sectional view of the nozzle in the apparatus in the locking position as shown in FIG. 1, in accordance with an example embodiment.
Figure 3:
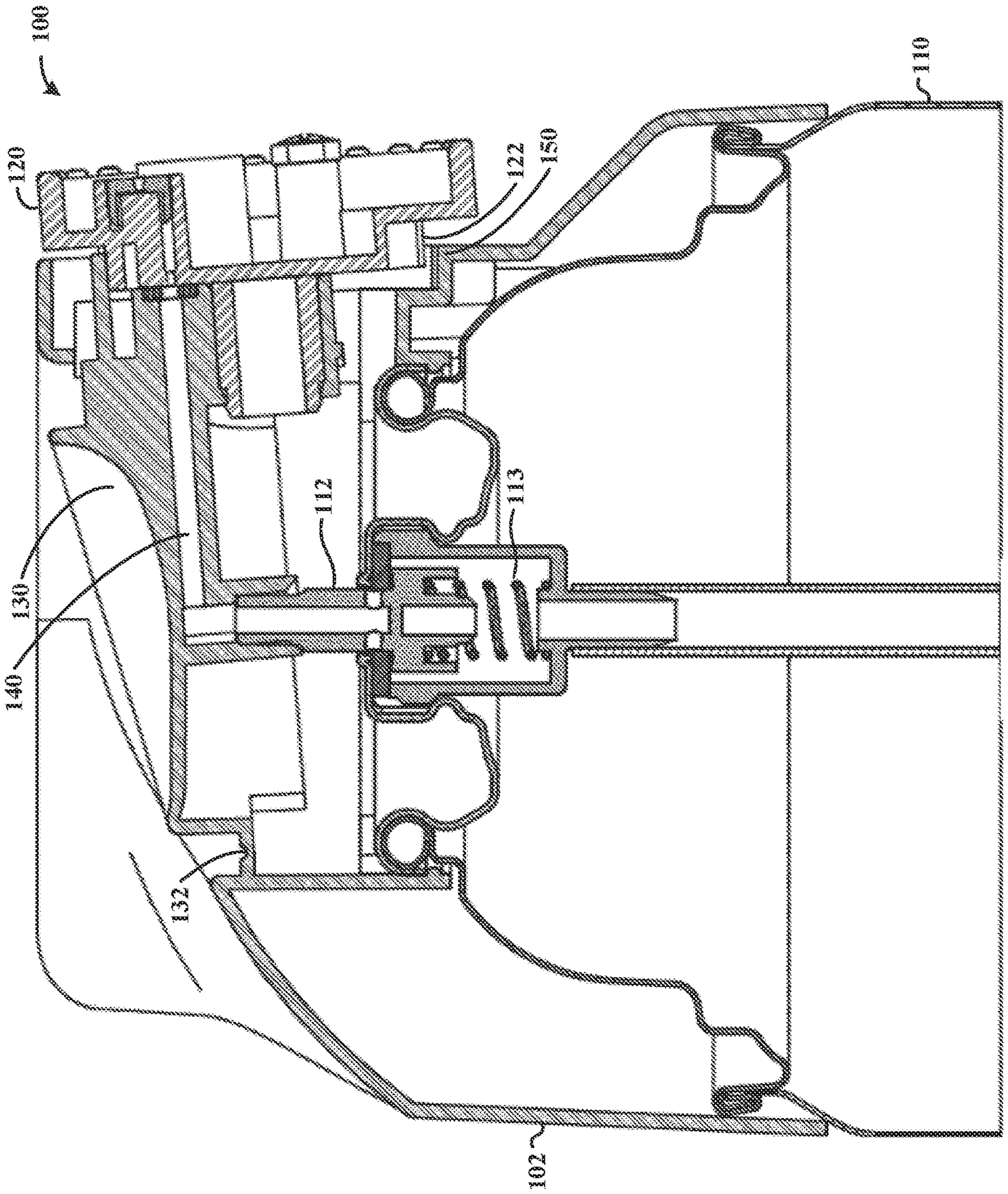
FIG. 3 shows a cross sectional view of the apparatus in FIG. 1, in an unlocked position, in accordance with an example embodiment.
Figure 4:
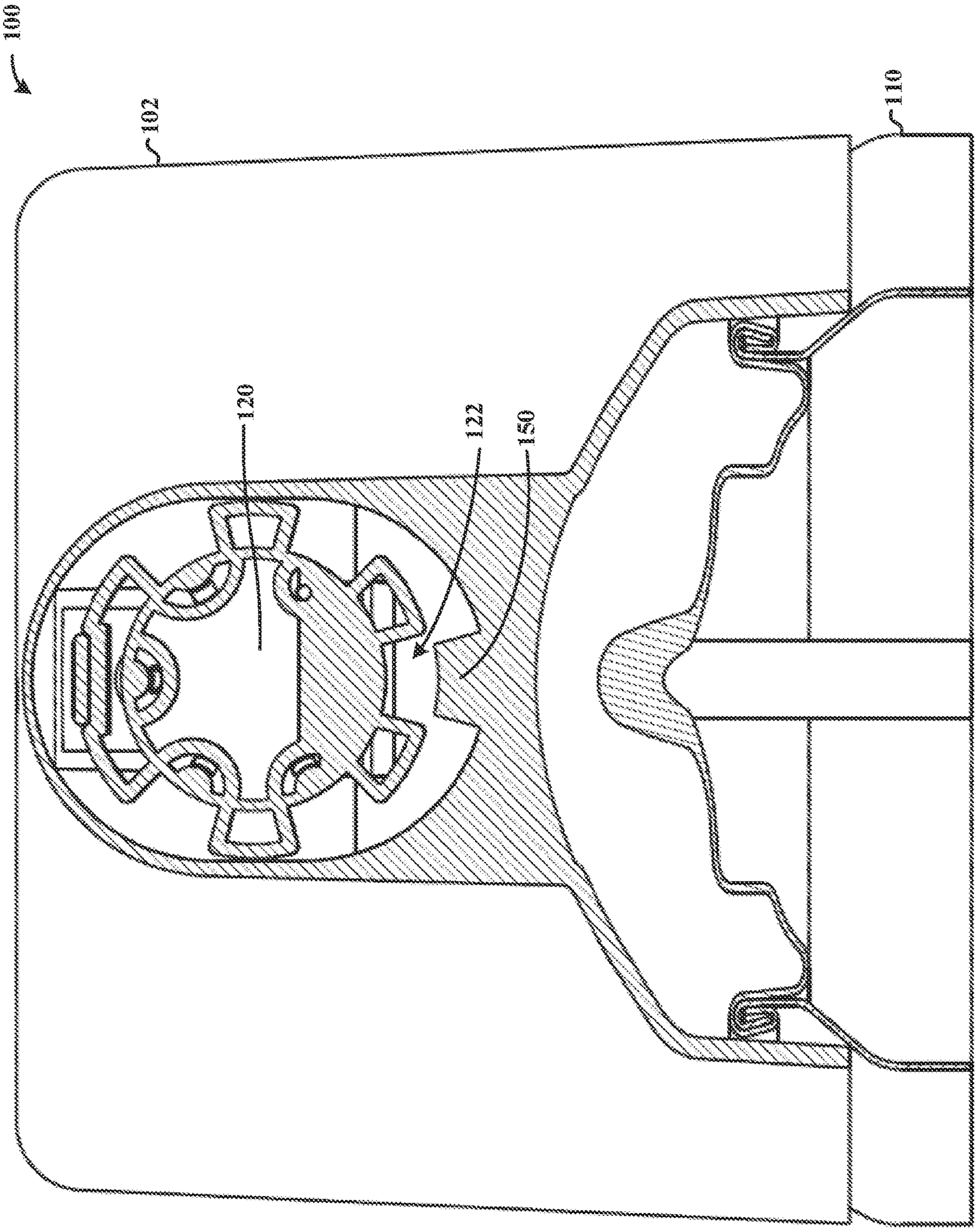
FIG. 4 shows a cross sectional view of the nozzle in the apparatus in the unlocked position as shown in FIG. 3, in accordance with an example embodiment.
Figure 5:
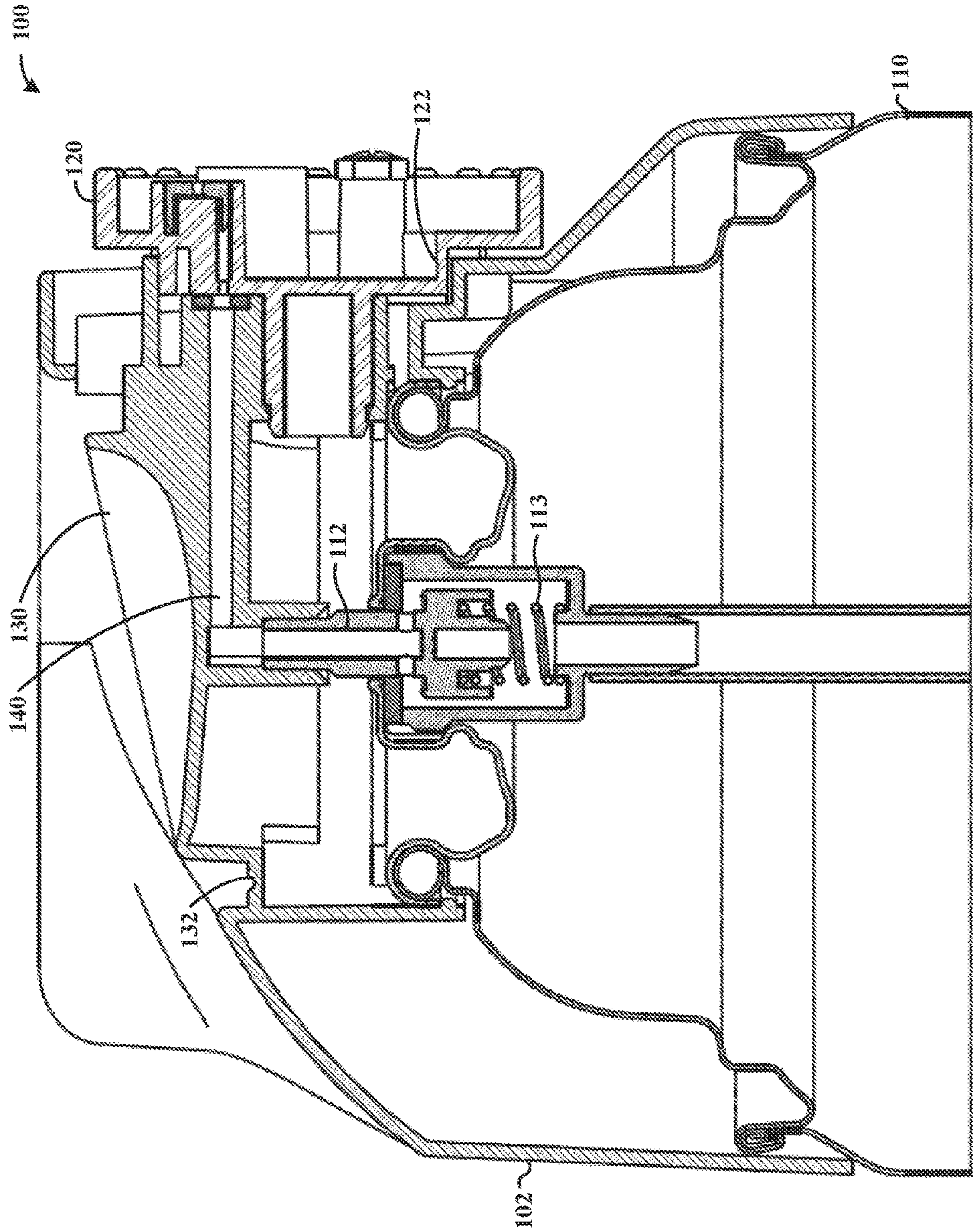
FIG. 5 shows a cross sectional view of the apparatus in FIG. 1, in an unlocked position and with a trigger in an actuated position for spraying aerosol liquid, in accordance with an example.
Figure 6:
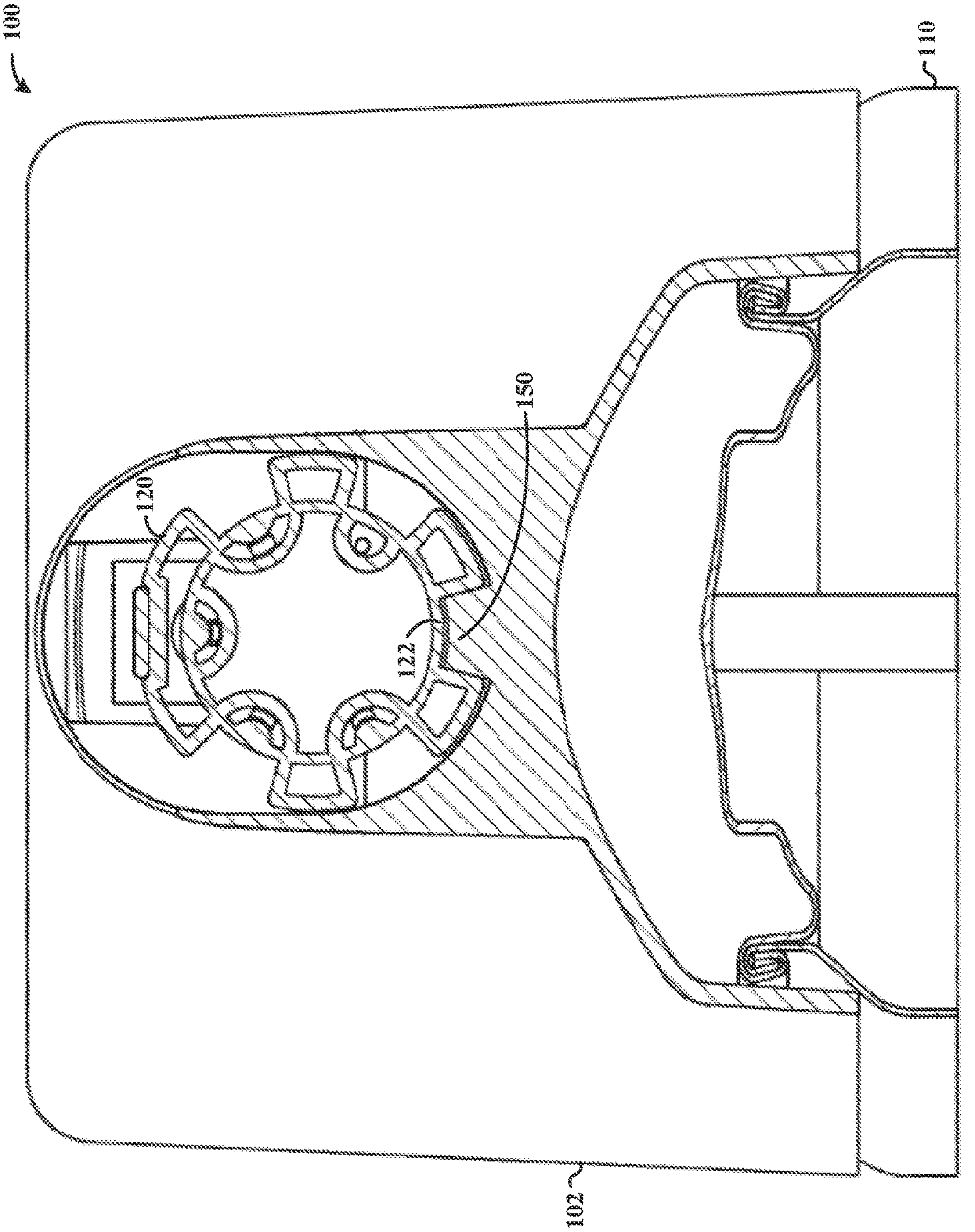
FIG. 6 shows a cross sectional view of the nozzle in the apparatus in the unlocked position with trigger actuated as shown in FIG. 5, in accordance with an example embodiment.

Turning now to the figures, FIGS. 1-6 show an apparatus 100 having a rotatable spray nozzle dial 120 with multiple apertures and a corresponding locking mechanism (using 121/150), as may be implemented in accordance with various embodiments. FIG. 1 shows a cross sectional view of the apparatus in a locked position, FIG. 3 shows a cross sectional view of the apparatus in an unlocked position, and FIG. 5 shows a cross sectional view of the apparatus in an unlocked position and actuated for spraying. FIGS. 2, 4 and 6 show cross-sectional views of dial 120 respectively in the locked, unlocked, and unlocked and actuated positions.

Referring to FIG. 1, the apparatus 100 includes a cap body 102 that is shown coupled to a canister 110, such as an aerosol can. The apparatus 100 is shown in a locked position in which a gear 121 on the dial is engaged with a tooth 150 of the cap body 102. Referring to FIG. 2, this locked position is further shown in cross-section, with a cog portion of the gear 121 engaged with the tooth 150, such that the tooth prevents the dial from being actuated in a downward directly as depicted in the figure. The dial 120 is connected to a button 130 (actuator), and has a shaft 129 coupled to a sleeve 141 in the cap body 102. The shaft 129 may rotate within the sleeve to facilitate rotation of the dial 120 and alignment of nozzles in the cap with channel 140. The channel 140 is further configured for alignment with a valve, by way of example shown with valve 112 of canister 110, for actuating the valve and delivering propelled liquid from the valve to nozzles in the dial 120.

Referring to FIGS. 3 and 4, the apparatus 100 is shown in an unlocked position in which the button 130 is free to move. Specifically, the dial 120 is in a position such that one of the nozzles therein is aligned to the channel 140, and further that the gear of the dial is aligned to mesh with the tooth 150, with a space 122 between cogs of the gear aligned over the tooth. In this position, the button 130 may be depressed and released to actuate valve 112, with spring 113 operating to maintain the valve 112 in a closed position when the button is not depressed.

Referring to FIGS. 5 and 6, the apparatus 100 is shown in the unlocked position with the button 130 actuated for spraying liquid, as may be released by the valve 112 from the canister 110 upon actuation. As shown in FIG. 5, the button 130 has been actuated downward toward the valve 112, compressing the spring 113 and opening the valve. Liquid from the canister 110 may thus be propelled via the channel to a nozzle in the dial 120. As shown in FIG. 6, the tooth 150 is meshed with the gear of the dial 120, into a region 122 between respective cogs of the gear in this actuated position.

In some embodiments, the apparatus 100 includes a pivot 132 about which the button 130 and dial 120 pivot. For instance, the pivot 132 may include a flexible portion of the cap body 102 that operates to bend in response to pressure applied to the button 130, a hinge, and/or other componentry that allows the button, dial 120 and related structure to actuate as shown in FIGS. 3 and 5.

Figure 7:
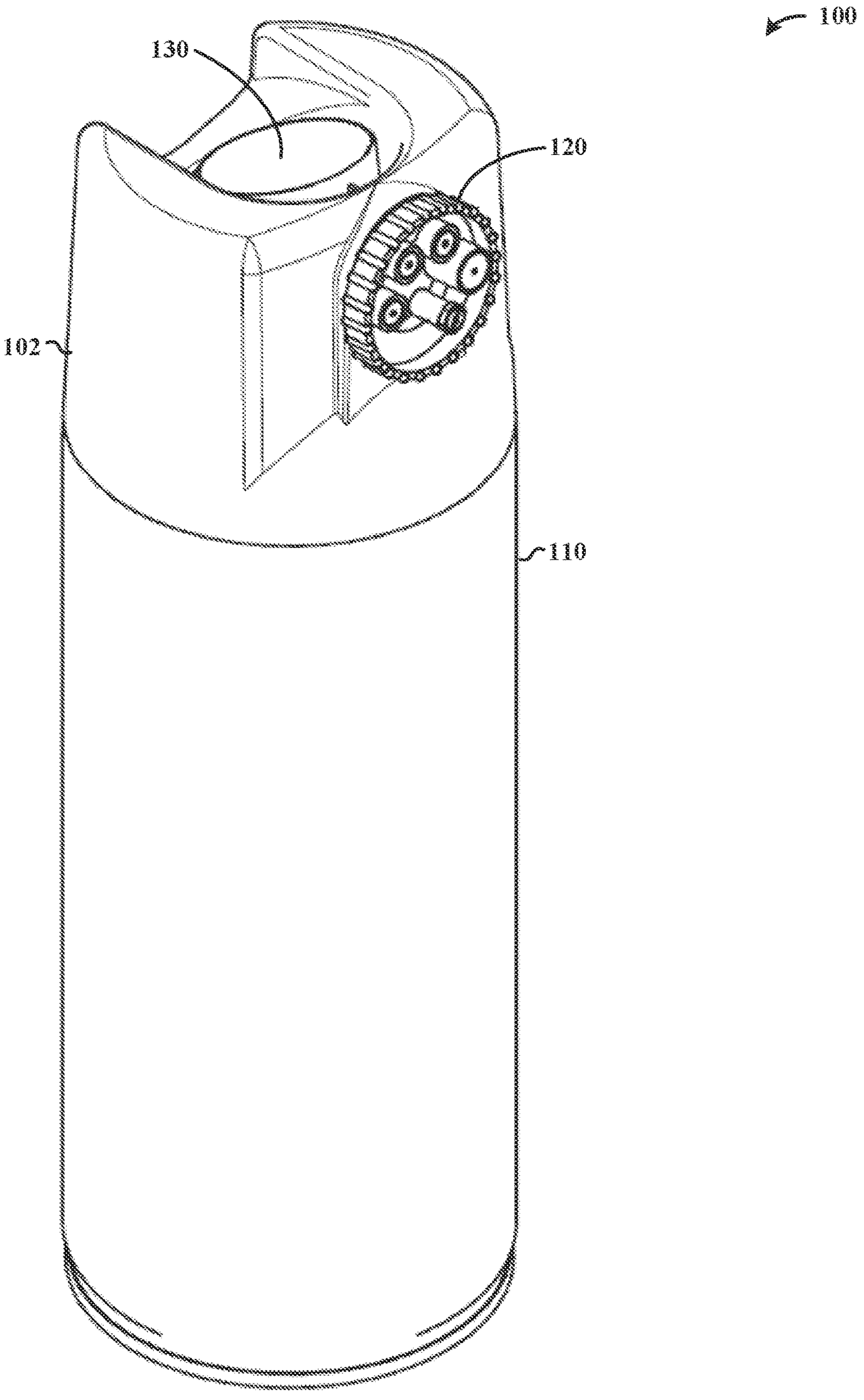
FIG. 7 shows an oblique view of an apparatus having a rotatable spray nozzle dial with multiple apertures and a corresponding locking mechanism, as may be implemented in accordance with one or more embodiments.
Figure 8:
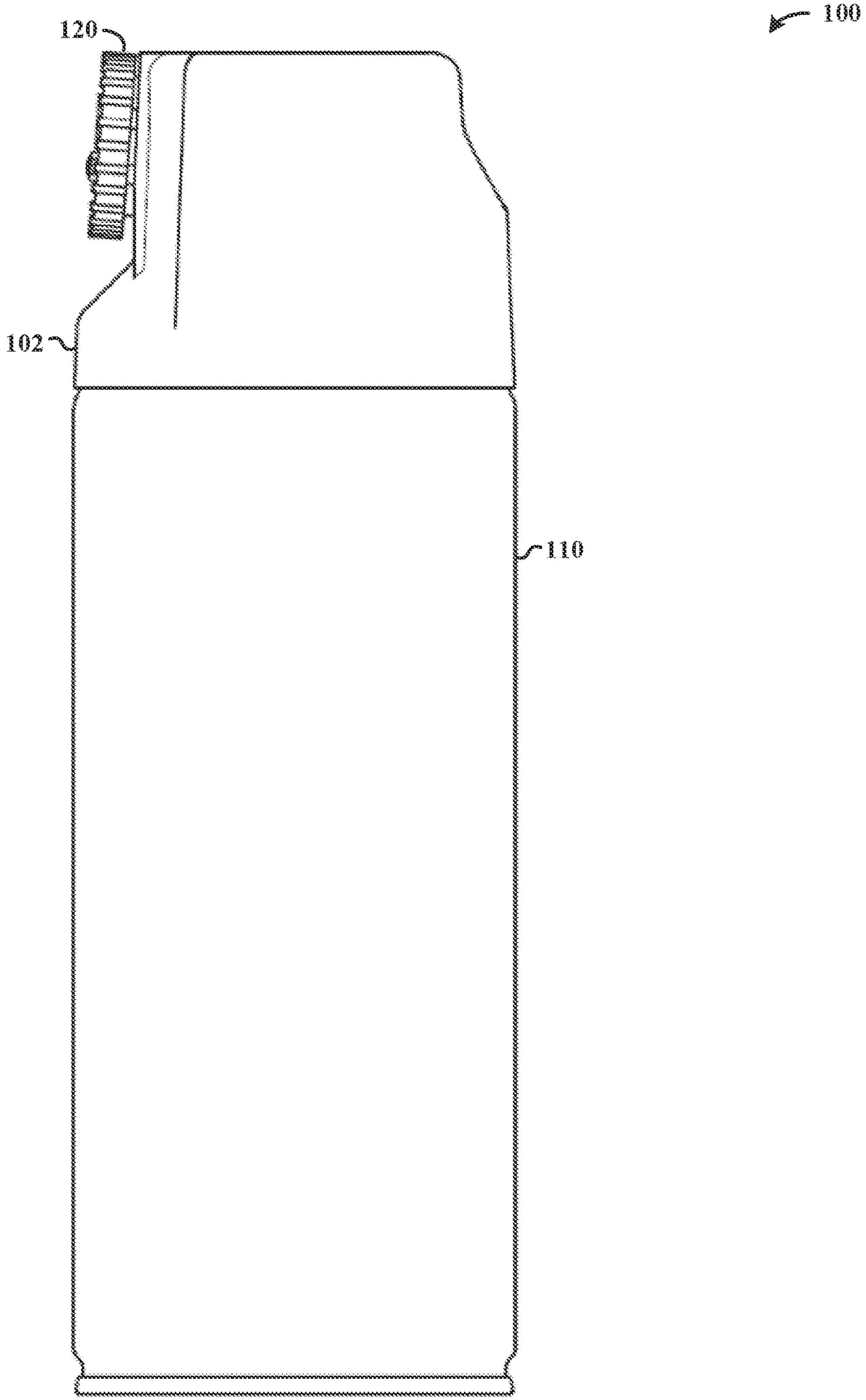
FIG. 8 shows a side view of the apparatus depicted in FIG. 7.
Figure 9:
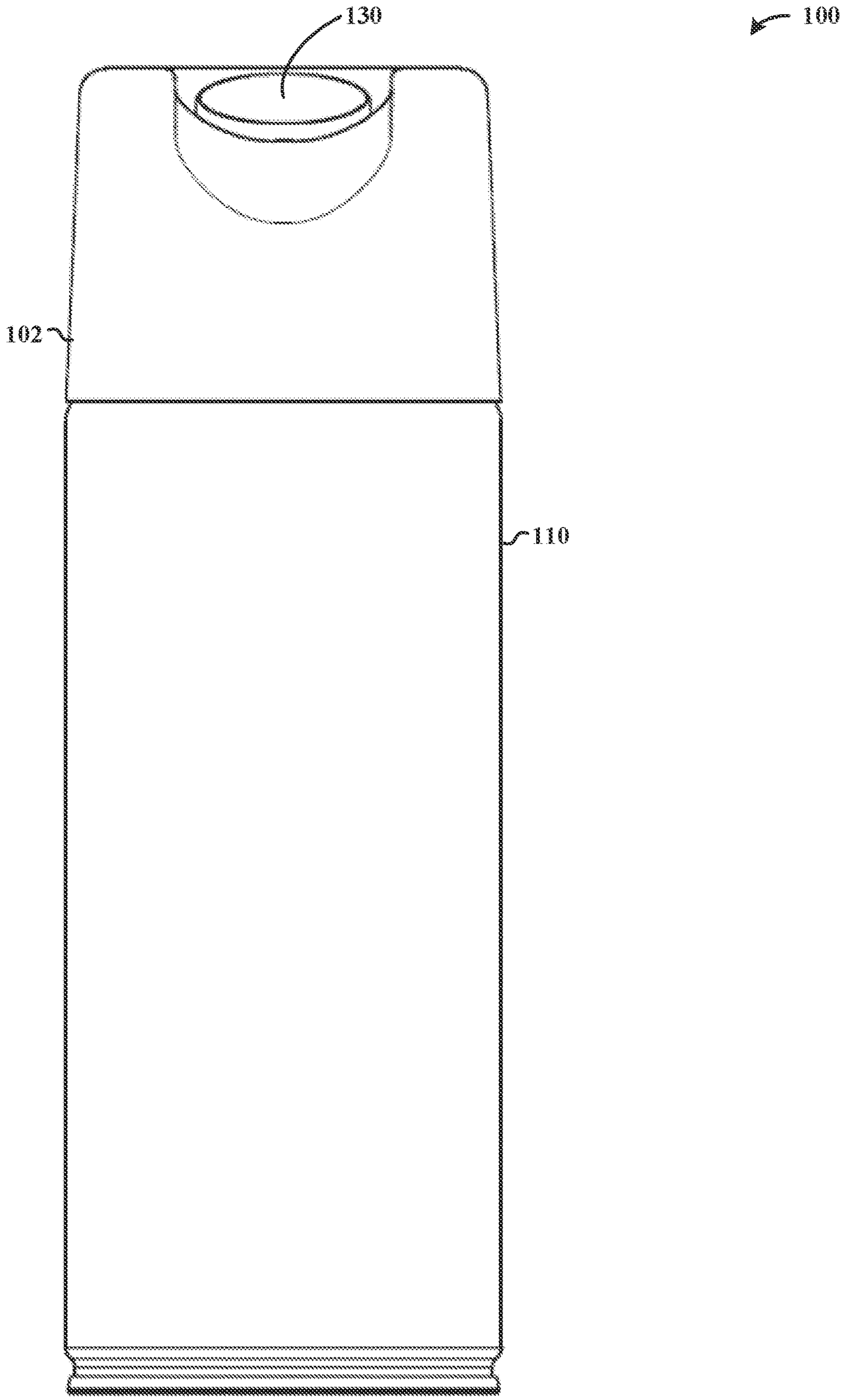
FIG. 9 shows a rear view of the apparatus depicted in FIG. 7.
Figure 10:
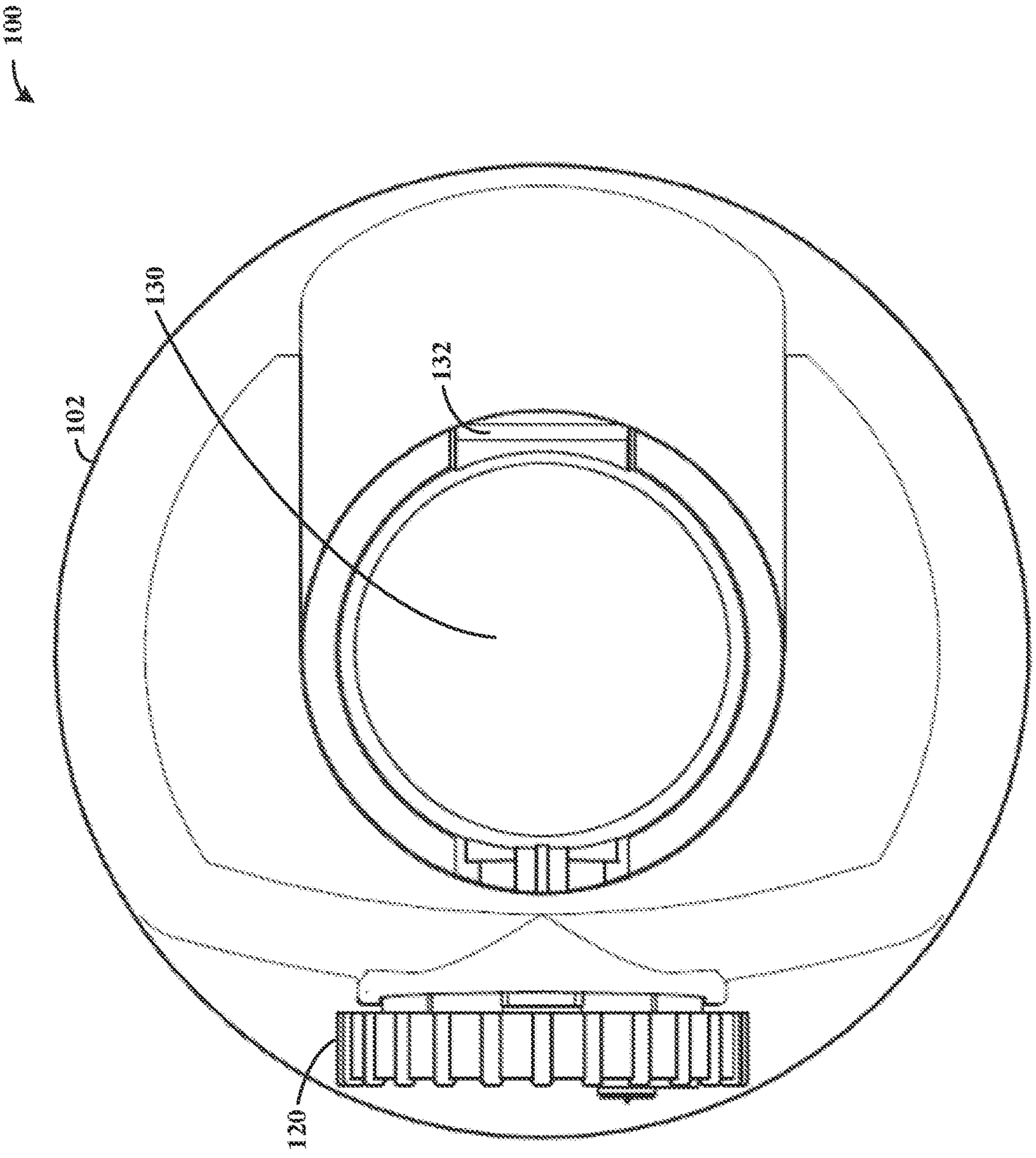
FIG. 10 shows a top view of the apparatus depicted in FIG. 7, as may be implemented in accordance with one or more embodiments.

FIG. 7 shows an oblique view of an apparatus 100 having a rotatable spray nozzle dial with multiple apertures, and a corresponding locking mechanism, as may be implemented in accordance with one or more embodiments. FIGS. 8, 9 and 10 respectively show side, rear and top views of the apparatus depicted in FIG. 7. Each of these figures may be implemented, for example, utilizing the apparatus depicted in FIGS. 1-6. Accordingly, similarly numbering is used for similar components. The apparatus 100 includes a cap body 102, a spray dial 120 and a button 130, with the cap body 102 coupled to a canister 110. The dial 120 is depicted having five nozzles. However, fewer or more nozzles, or nozzles of other sizes and/or shapes are implemented, in accordance with various embodiments.

The apparatus includes a locking mechanism integrated with the dial 120 and cap body 102, for selectively operating in a locked position in which the button 130 is prevented from being depressed, and in an and unlocked position in which button 130 is allowed to actuate. This locking mechanism may be implemented, for example, using a gear and tooth as depicted in FIGS. 1-6. The dial 120 is operable for placing the locking mechanism in an unlocked position by rotating to align one of the nozzles to a channel within the cap body 102 for receiving propelled liquid from the canister 110. In response to the button 120 being pressed when the dial 120 is in the unlocked position corresponding to the aforementioned nozzle alignment, liquid is propelled from the canister 110 through the aligned nozzle in dial 120. The dial 120 is further operable for placing the locking mechanism in a locked position by rotating such that the nozzles are not aligned to the channel, under which conditions depression of the button is blocked. In this context, the dial 120 may move/actuate with the button 130 as it is depressed and released, for instance using a hinge or pivot type mechanism as depicted herein or otherwise.

Figure 11:
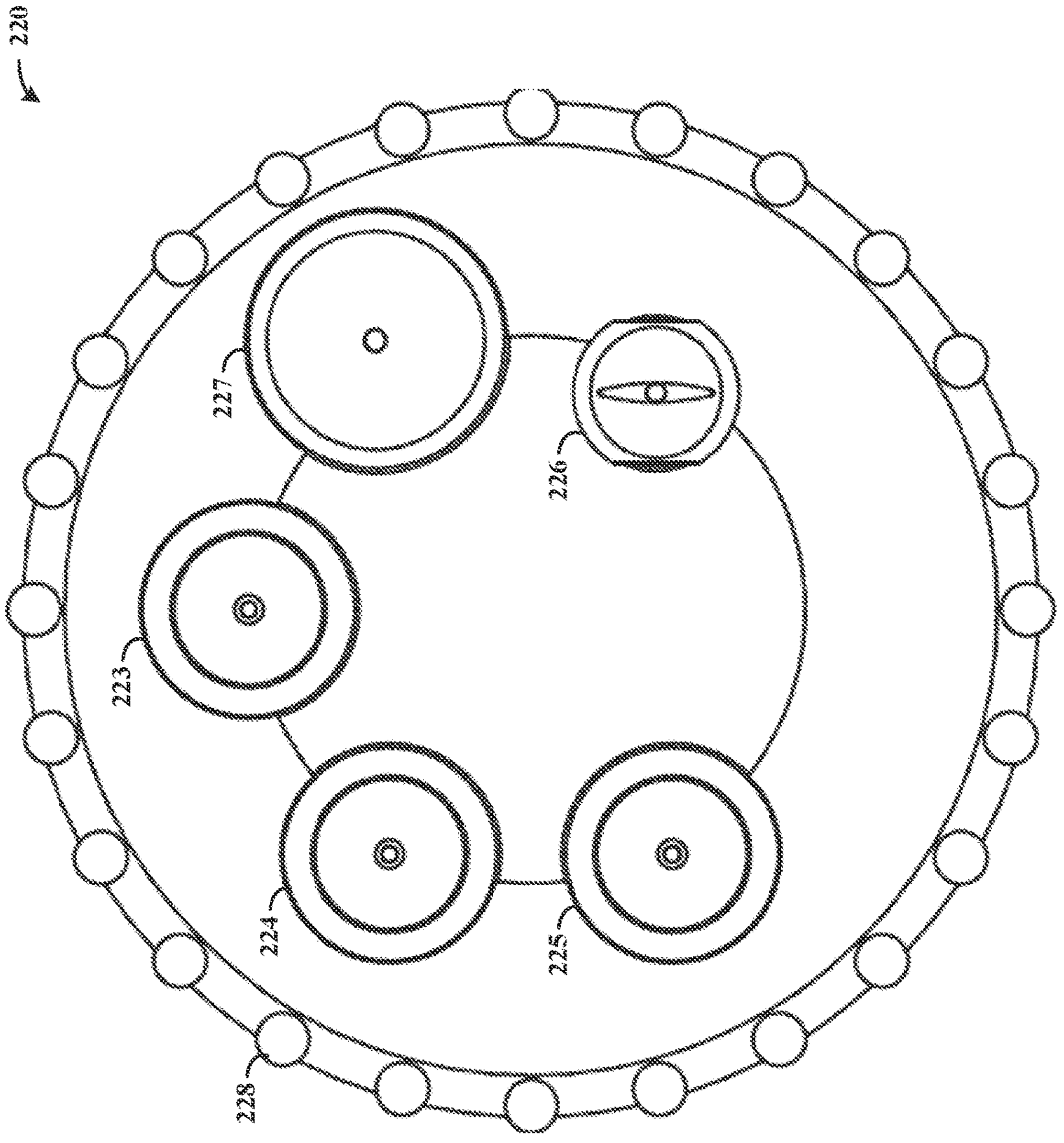
FIG. 11 shows a front view of a rotatable dial with multiple spray nozzles, as may be implemented in accordance with one or more embodiments.

FIGS. 11-14 depict various embodiments involving rotatable dials, which may be implemented together. Further, the respective embodiments may be implemented with one or more aspects of FIGS. 1-10, such as with dial 120. FIG. 11 shows a front view of a rotatable dial 220 having multiple spray nozzles 223-227. The rotatable dial 220 may have raised features 228, which provide grip for rotation. When implemented with the embodiment shown in FIG. 5, the apparatus 100 may thus operate to spray liquid through one of the nozzles 223-227 that is aligned to channel 140, upon actuation of button 130. For instance, with channel 140 positioned as shown in FIG. 5 and nozzle 223 shown in FIG. 11 aligned to the channel, fluid such as paint may be sprayed through the nozzle 223 when the button 130 is depressed.

Figure 12:
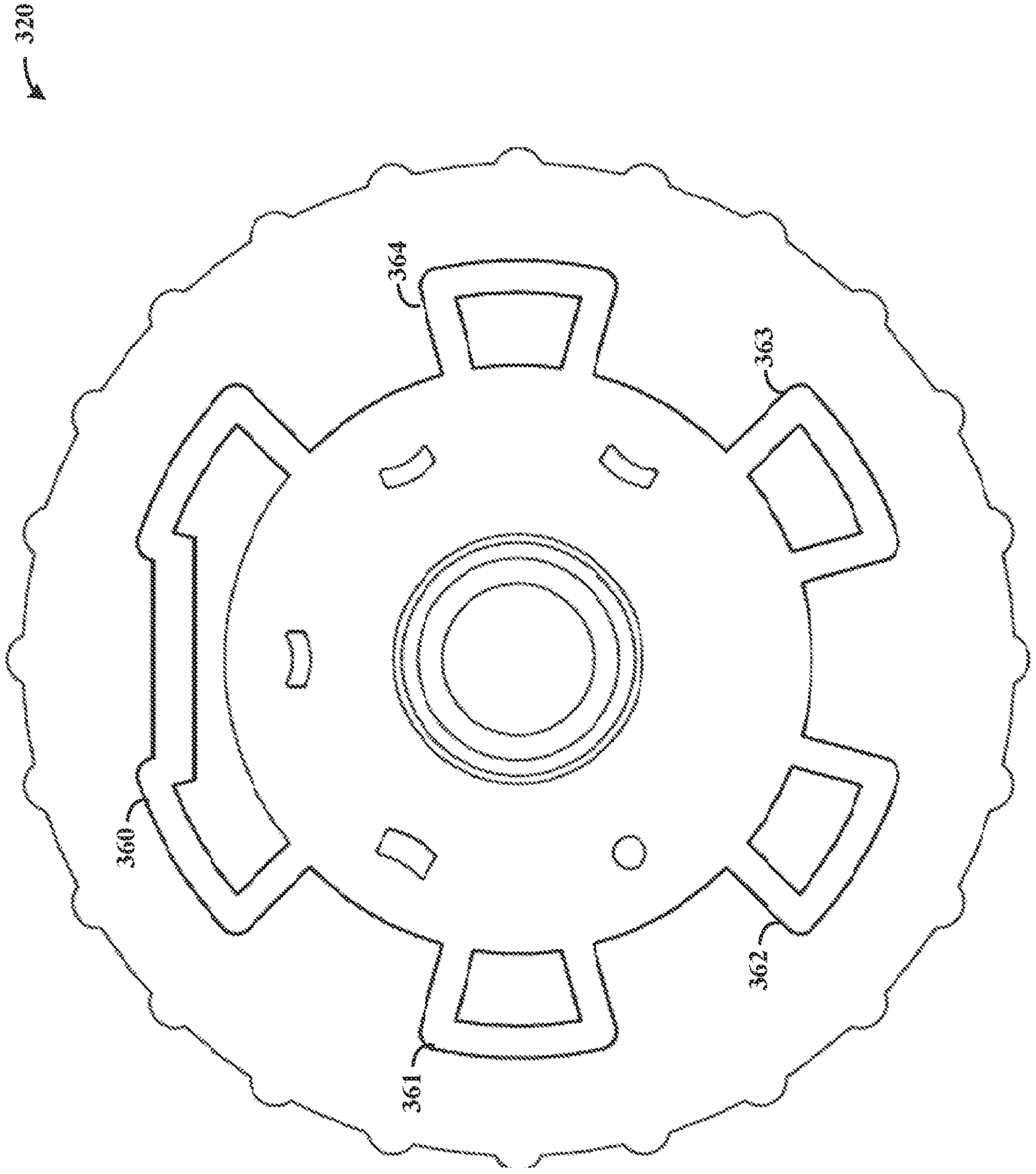
FIG. 12 shows a rear view of a rotatable dial with a locking mechanism, as may be implemented in accordance with one or more embodiments.

FIG. 12 shows a rear view of a rotatable dial 320 with a locking mechanism, as may be implemented in accordance with one or more embodiments. The locking mechanism includes a gear having cogs 360-364, and recessed regions between the cogs. The cogs 360-364 are configured to interact with a tooth or other structure to prevent movement of the dial 320. For instance, when implemented with the embodiment shown in FIGS. 1 and 2, one of the cogs (e.g., 363) may be utilized to interact with tooth 150 in a manner as shown in FIG. 2 with gear portion 121 contacting the tooth. Similarly when implemented with the embodiment shown in FIGS. 5 and 6, the recessed region between cogs 363 and 363 may be aligned to tooth 150, allowing actuation of the rotatable dial 320 and dispensing of liquid. When implemented with the rotatable dial 220 of FIG. 11, the positions of the respective dials 320 and 220 may be as depicted in these figures with nozzle 223 aligned with channel 140 for spraying upon meshing of the region between cogs 362 and 363 with tooth 150.

Figure 13:
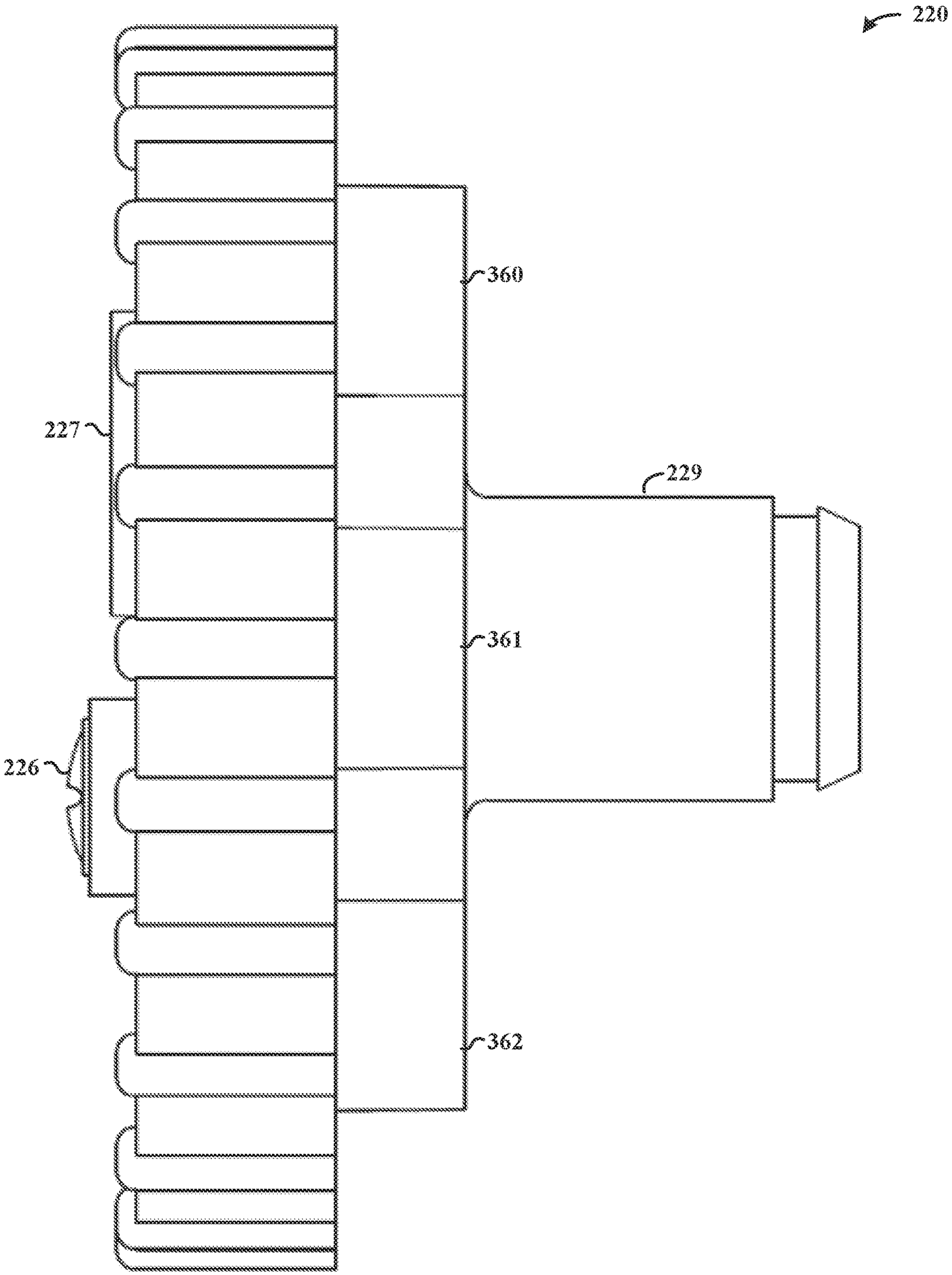
FIG. 13 shows a side view of a rotatable dial with multiple spray nozzles, as may be implemented in accordance with one or more embodiments.
Figure 14:
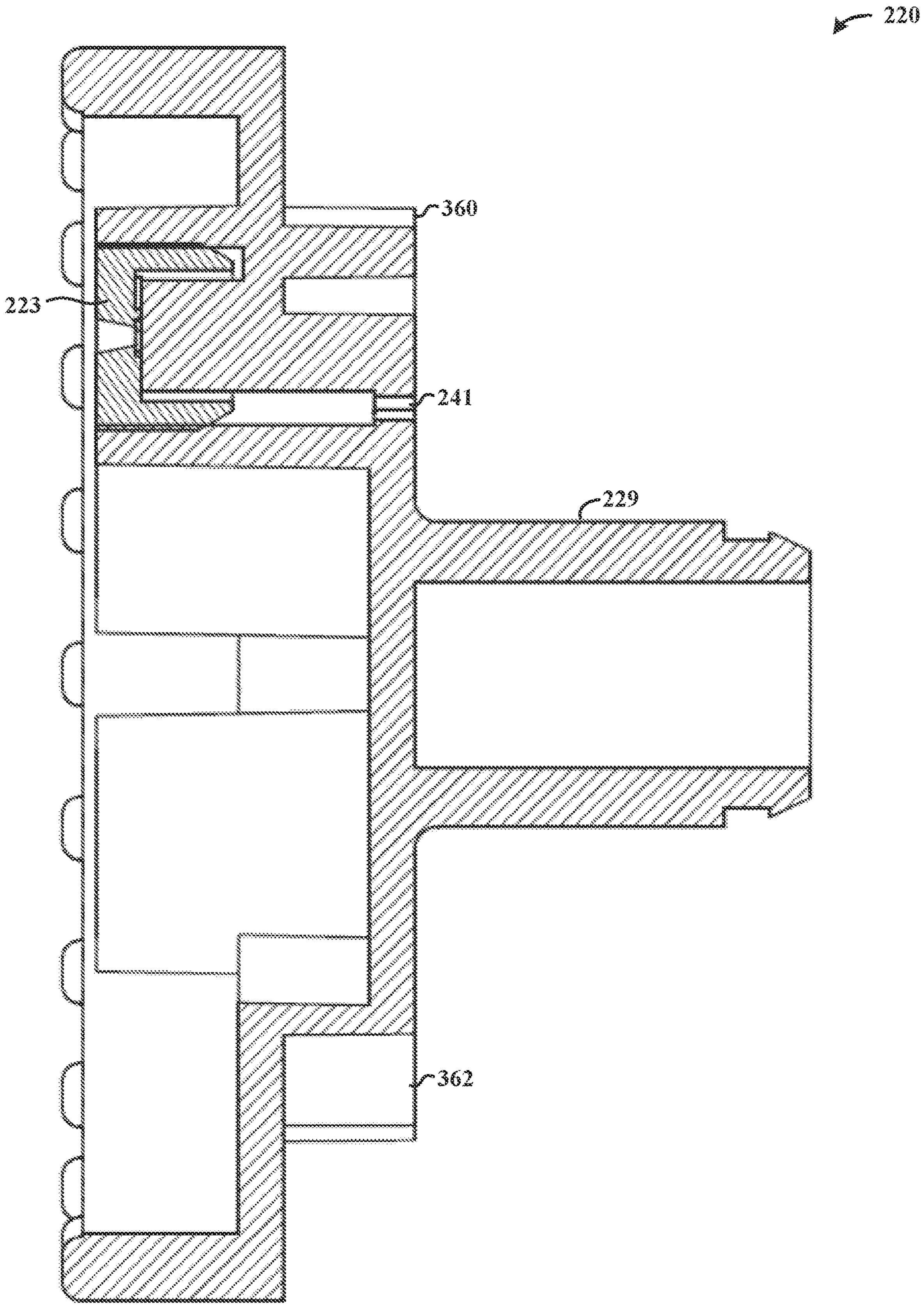
FIG. 14 shows a cross-sectional view of the rotatable dial shown in FIG. 13, as may be implemented with one or more embodiments.

FIGS. 13 and 14 respectively show side and cross-sectional views of an embodiment the rotatable dial 220 of FIG. 11, as may be implemented in accordance with one or more embodiments. In this embodiment, the rotatable dial 220 has a shaft 229 configured for engaging with a sleeve for rotation of the rotatable dial 220 and alignment of the spray nozzles 223-227. This embodiment further utilizes a gear as depicted in FIG. 12, with cogs 360, 361 and 362 visible in the position shown. This embodiment of the rotatable dial 220 may be implemented, for example, as the dial 110 as shown in FIG. 1, with the shaft 229 corresponding to shaft 129 and operable for engagement with the sleeve 141.

Referring specifically to FIG. 14, a channel 241 is configured for selective alignment with another channel (e.g., channel 140) for receiving propelled liquid and coupling that propelled liquid to spray nozzle 223. Each respective one of the spray nozzles 224-227 have similar channels that are operable for alignment for receiving propelled liquid. Cogs, including visible cogs 360 and 362, are accordingly arranged to facilitate actuation of the rotatable dial 220 when in the position shown, or in positions in which one of the other spray nozzles 224-227 is rotated into the position in which spray nozzle 223 is depicted.

Figure 15:
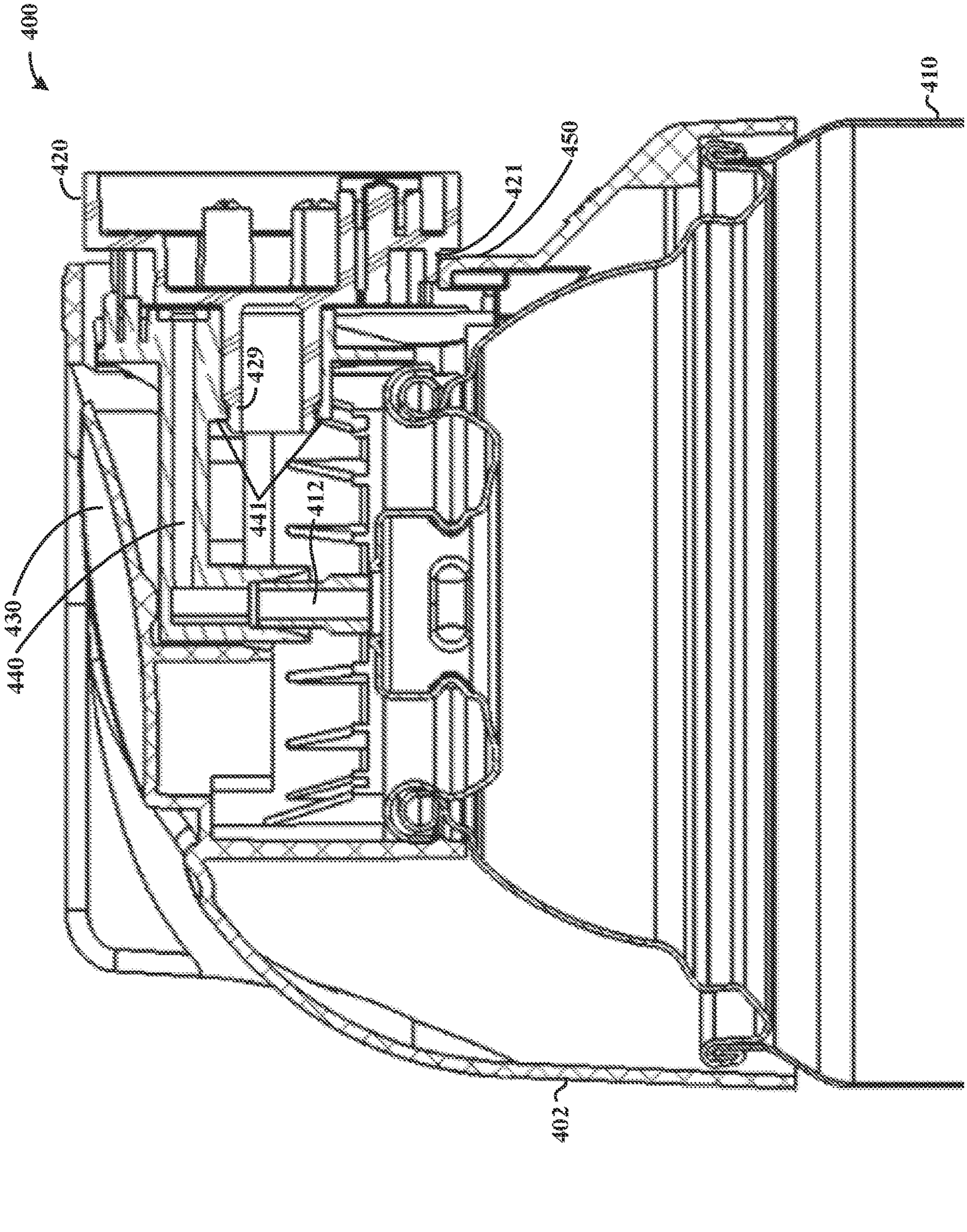
FIG. 15 shows a cross sectional view of an apparatus having a rotatable spray nozzle dial with multiple apertures and a corresponding locking mechanism, with the apparatus in a locked position and coupled to an aerosol can, as may be implemented in accordance with various embodiments.
Figure 16:
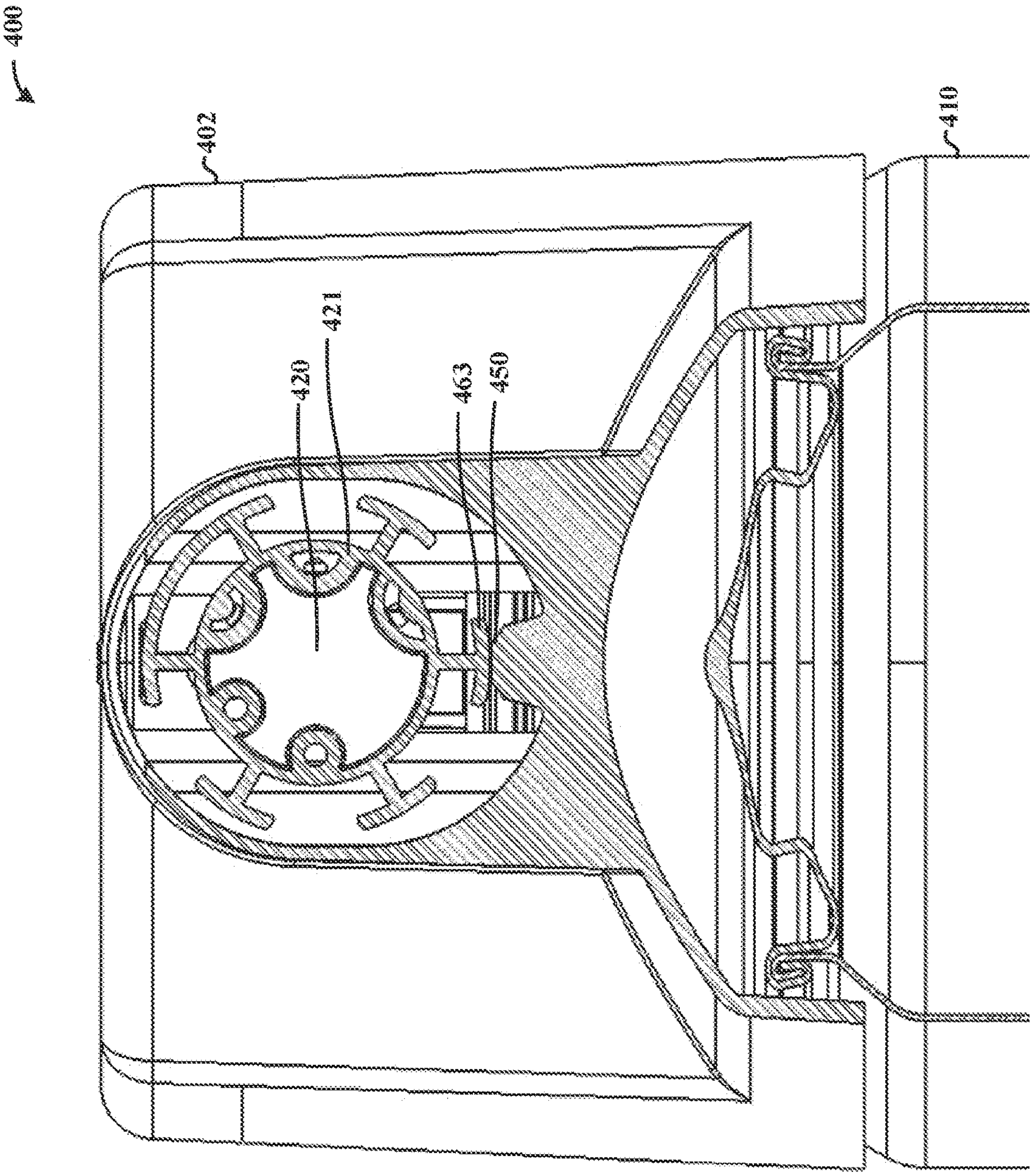
FIG. 16 shows a cross sectional view of the nozzle in the apparatus in the locking position as shown in FIG. 15, in accordance with an example embodiment.
Figure 17:
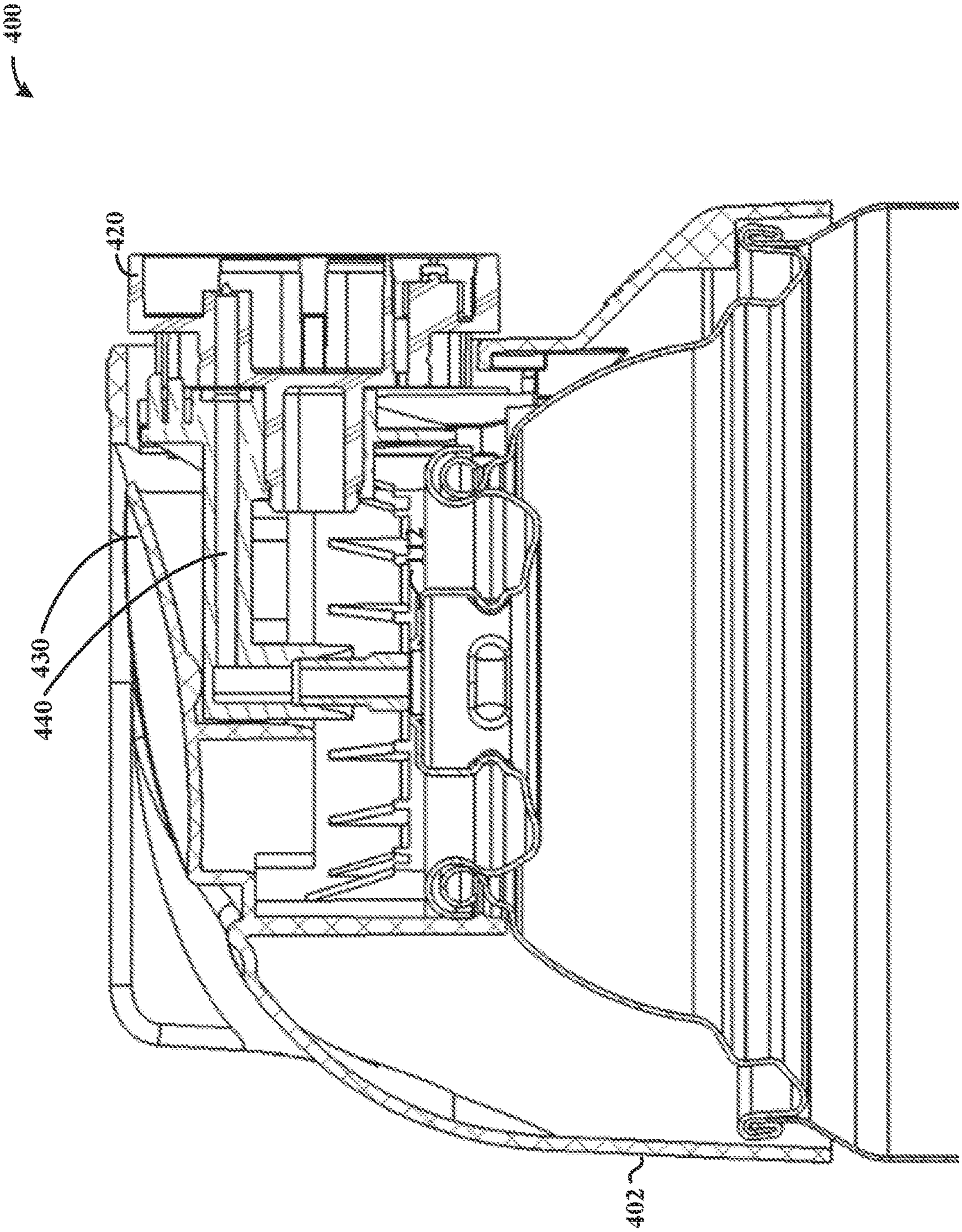
FIG. 17 shows a cross sectional view of the apparatus in FIG. 15, in an unlocked position, in accordance with an example embodiment.
Figure 18:
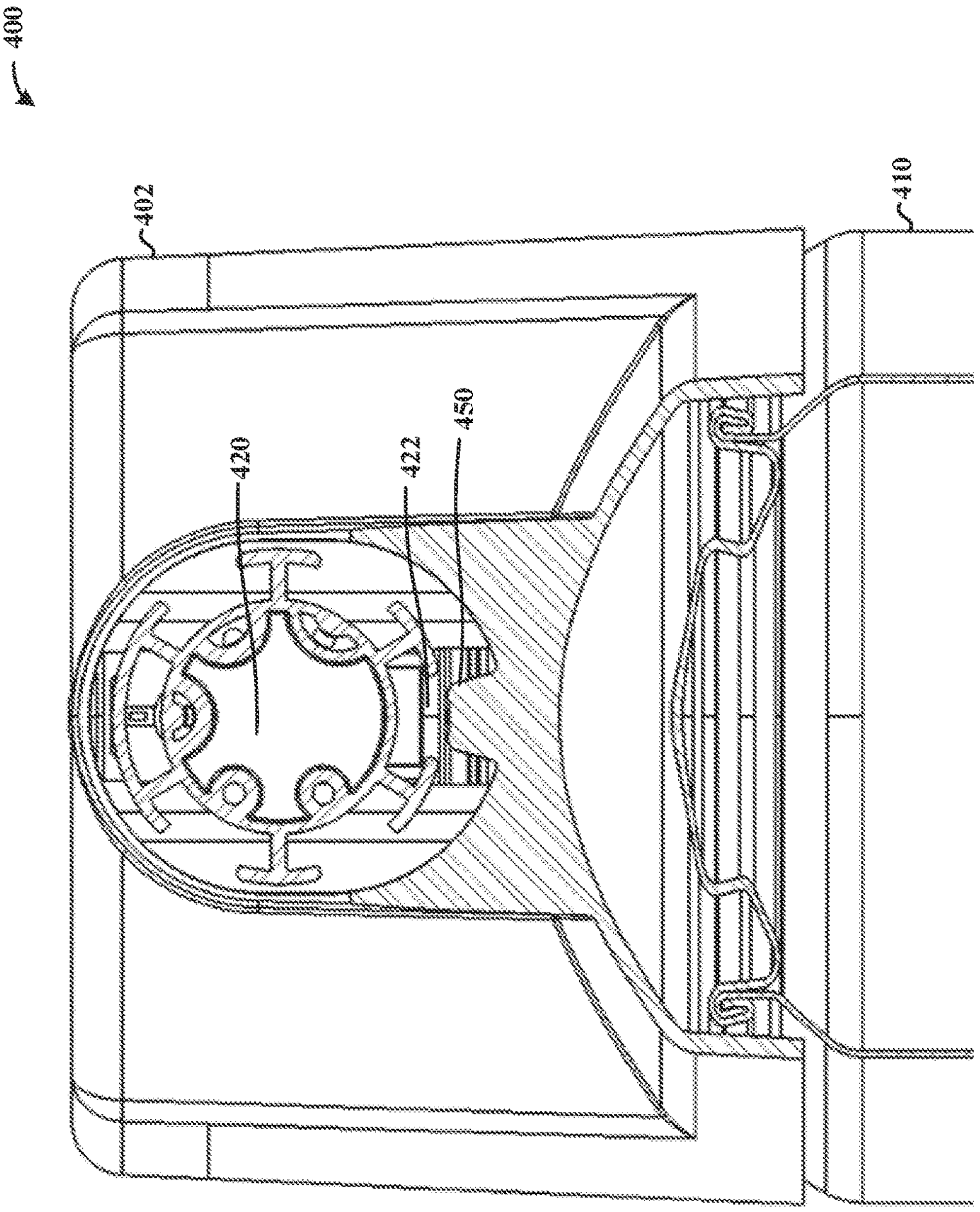
FIG. 18 shows a cross sectional view of the nozzle in the apparatus in the unlocked position as shown in FIG. 17, in accordance with an example embodiment.
Figure 19:
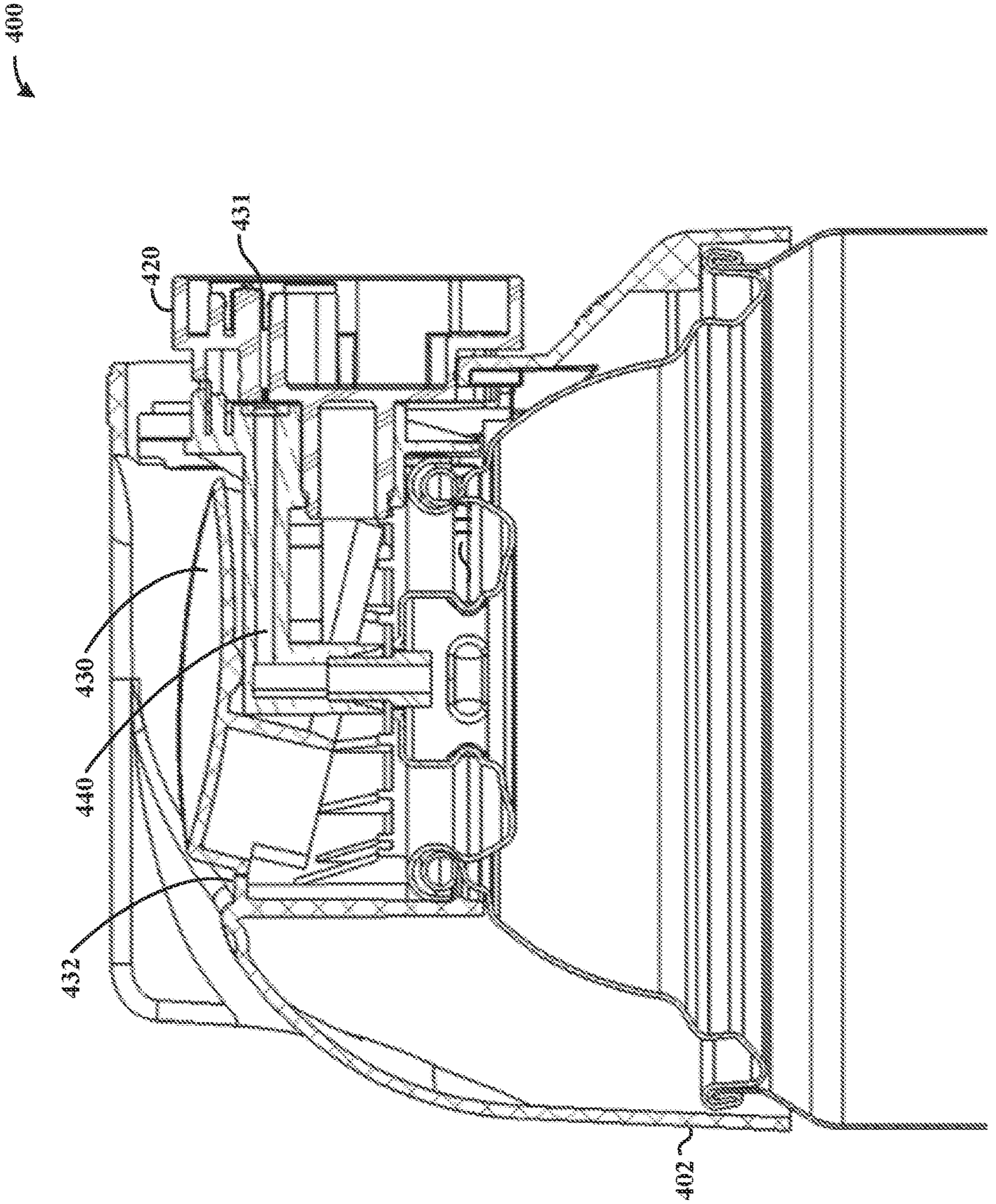
FIG. 19 shows a cross sectional view of the apparatus in FIG. 15, in an unlocked position and with a trigger in an actuated position for spraying aerosol liquid, in accordance with an example.
Figure 20:
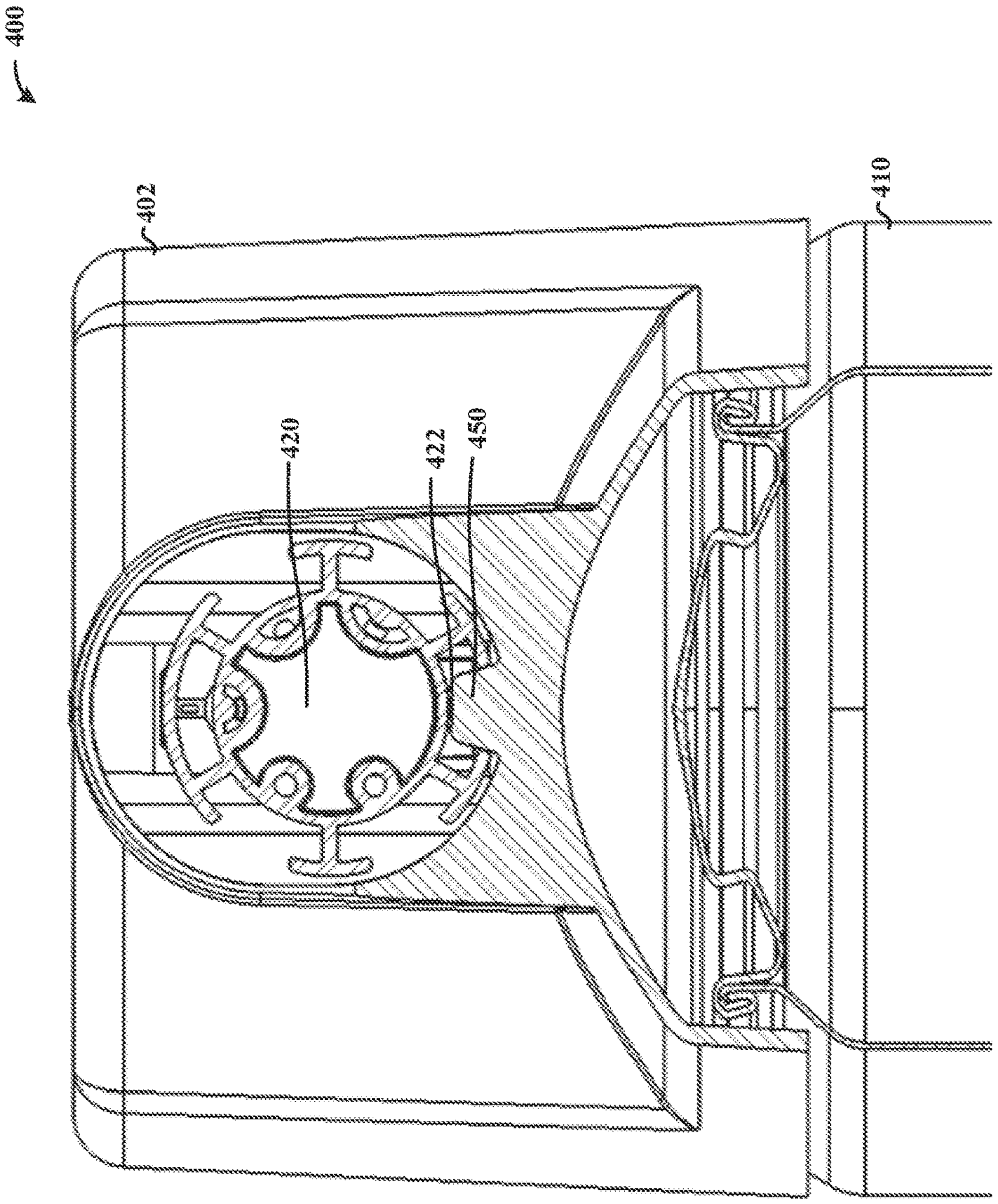
FIG. 20 shows a cross sectional view of the nozzle in the apparatus in the unlocked position with trigger actuated as shown in FIG. 19, in accordance with an example embodiment.

FIGS. 15-20 show an apparatus 400 having a rotatable spray nozzle dial 420 with multiple apertures and a corresponding locking mechanism (using 422/450), as may be implemented in accordance with various embodiments. FIG. 15 shows a cross sectional view of the apparatus in a locked position, with FIG. 16 showing a cross-sectional view of the dial 420 in the locked position. FIG. 17 shows a cross sectional view of the apparatus in an unlocked position and amenable to actuation, with FIG. 18 showing a cross-sectional view of the diel in this unlocked position. FIG. 19 shows a cross sectional view of the apparatus in an unlocked position and actuated for spraying (with button/actuator 430 depressed), and FIG. 20 shows a cross-sectional view of dial 420 in the unlocked and actuated position.

Specifically referring to FIGS. 15 and 16, the apparatus 400 includes a cap body 402 that is shown coupled to a canister 410, such as an aerosol can. The apparatus 400 is shown in a locked position in which a gear 421 on the dial is engaged with a tooth 450 of the cap body 402. Referring to FIG. 16, in this locked position a cog portion 463 of the gear 421 is engaged with the tooth 450, such that the tooth prevents the dial from being actuated in a downward directly as depicted in the figure (e.g., when downward pressure is applied to button 430, the tooth and cog prevent the button from actuating). The dial 420 has a shaft 429 coupled to a sleeve 441 in the cap body 402. The shaft 429 may rotate within the sleeve to facilitate rotation of the dial 420 and alignment of nozzles in the cap with channel 440. The channel 440 is further configured for alignment with a valve, by way of example shown with valve 412 of canister 410, for actuating the valve and delivering propelled liquid from the valve to nozzles in the dial 420.

Figure 23:
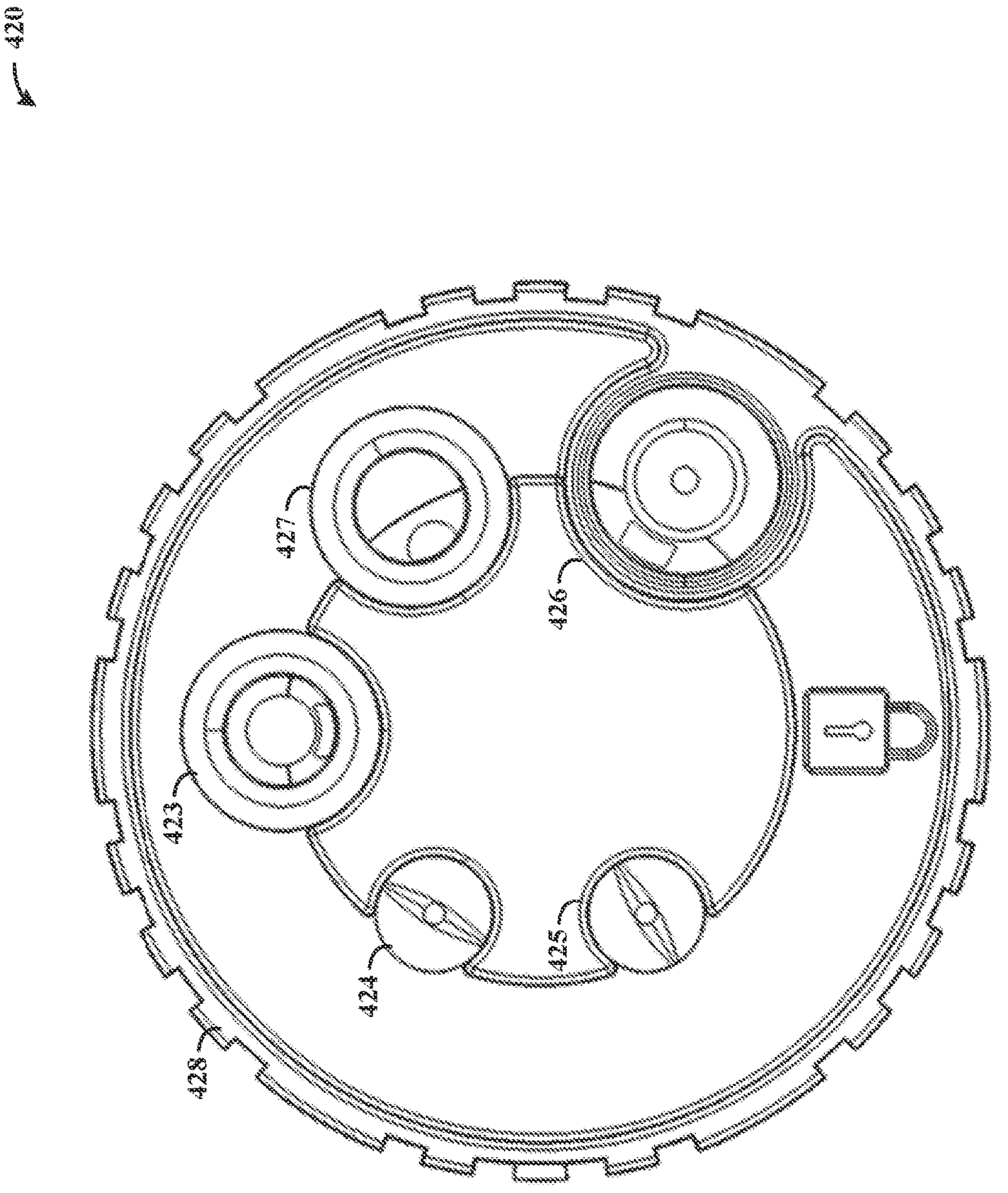
FIG. 23 shows a front view of a rotatable dial with multiple spray nozzles, as may be implemented in accordance with one or more embodiments.

Referring to FIGS. 17 and 18, the apparatus 400 is shown in an unlocked position in which the button 430 is free to move downward in response to pressure applied thereto. Specifically, the dial 420 is in a position such that one of the nozzles therein (e.g., as may be implemented as shown in FIG. 23) is aligned to the channel 440. In this position, the gear of the dial is aligned to mesh with the tooth 450, with a space 422 between cogs of the gear aligned over the tooth as depicted in FIG. 18.

In the unlocked position as shown in FIGS. 17 and 18, the button 430 may be depressed and released to actuate valve 412, as depicted in FIGS. 19 and 20 with the button 430 actuated for spraying liquid released through 412 from the canister 410. As shown in FIG. 19, liquid from the canister 410 may be propelled via the channel 440 to a nozzle 431 in the dial 420. As shown in FIG. 20, the tooth 450 is meshed with the gear of the dial 420, with the toot extending into the space 422 between respective cogs of the gear in this actuated position.

The apparatus 400 may include a pivot 432 about which the button 430 pivots. For instance, the pivot 432 may include a flexible portion of the cap body 402 that operates to bend in response to pressure applied to the button 430, a hinge, and/or other componentry that allows the button to pivot and the gear 422 to actuate as shown in FIGS. 17 and 18.

Figure 21:
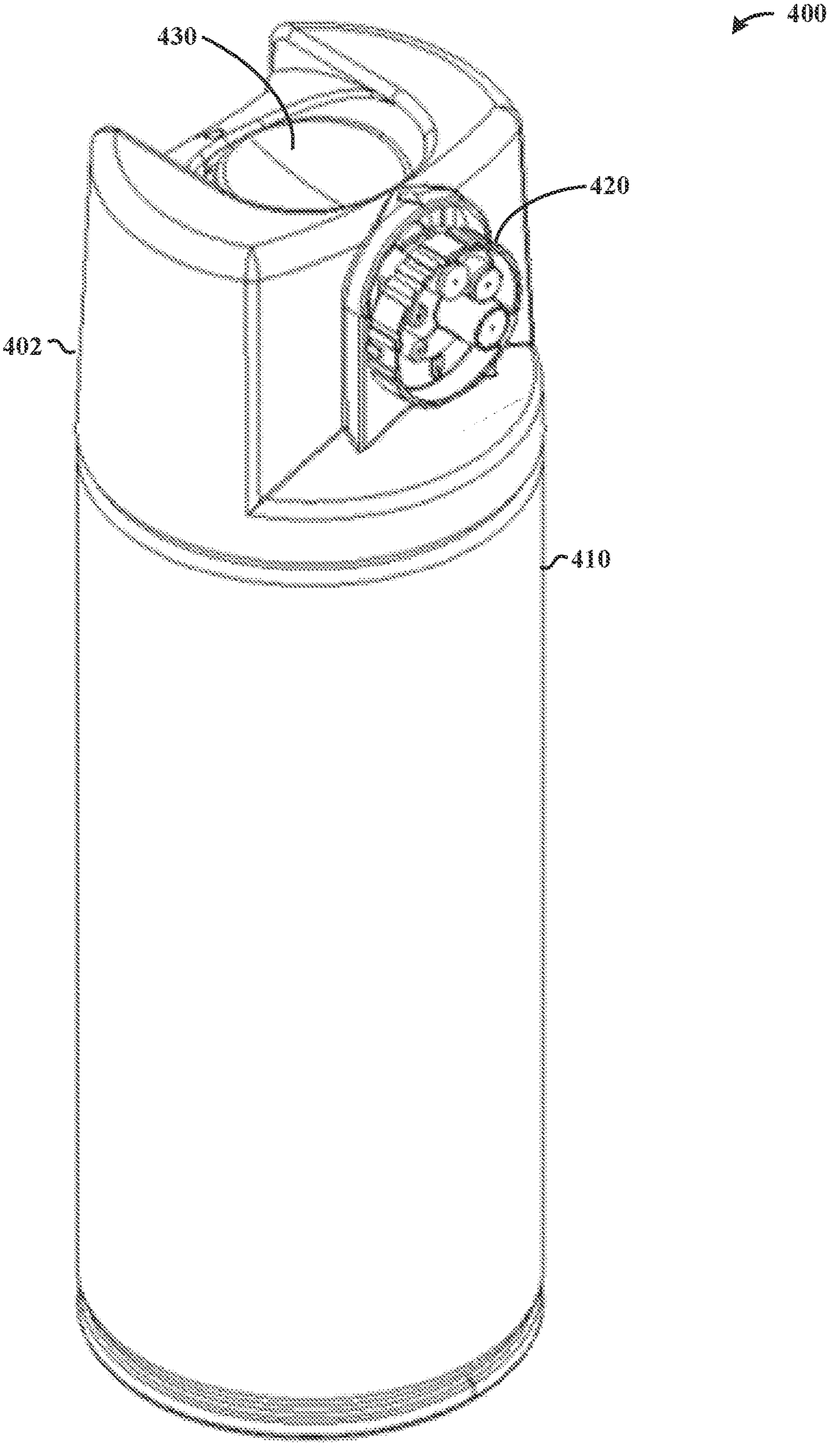
FIG. 21 shows an oblique view of an apparatus having a rotatable spray nozzle dial with multiple apertures and a corresponding locking mechanism, as may be implemented in accordance with one or more embodiments.
Figure 22:
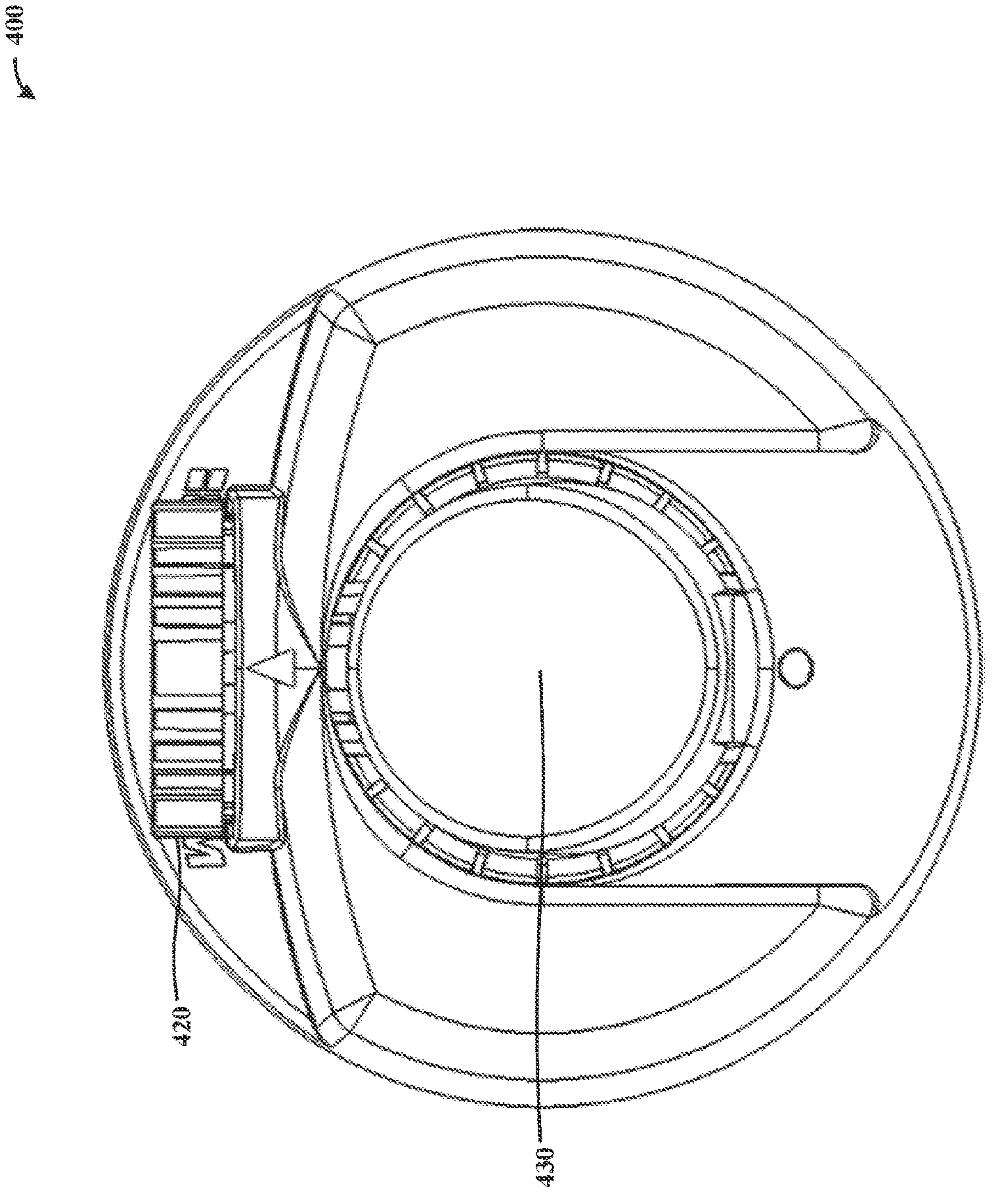
FIG. 22 shows top view of the apparatus depicted in FIG. 21, as may be implemented in accordance with one or more embodiments.

FIGS. 21 and 22 show oblique and top views of an apparatus 400, as may be implemented in accordance with one or more embodiments. These figures may be implemented, for example, utilizing the apparatus depicted in FIGS. 15-20 with the locking mechanisms therein. Accordingly, similarly numbering is used for similar components. The dial 420 is thus operable for placing the locking mechanism in a locked position by rotating such that the nozzles are not aligned to the channel, under which conditions depression of the button 430 is blocked. When the dial 420 is rotates such that a nozzle is in alignment with a channel for spraying, button 430 may be actuated. The apparatus 400 includes a cap body 402, a spray dial 420 and a button 430, with the cap body 402 coupled to a canister 410, with the understanding that the cap body 402 may be implemented with various types, shapes and sizes of canisters. The dial 420 is depicted having five nozzles. However, fewer or more nozzles, or nozzles of other sizes and/or shapes are implemented, in accordance with various embodiments.

FIGS. 23-27 depict various embodiments involving rotatable dials, which may be implemented together. Further, the respective embodiments may be implemented with one or more aspects of FIGS. 15-22, such as with dial 420, with each dial in FIGS. 23-27 similarly numbered. FIG. 23 shows a front view of a rotatable dial 420 having multiple spray nozzles 423-427. The rotatable dial 420 may have raised features 428 that may provide grip for rotation. When implemented with the embodiment shown in FIGS. 19 and 20, the apparatus 400 may thus operate to spray liquid through one of the nozzles 423-427 that is aligned to channel 440, upon actuation of button 430. For instance, with channel 440 positioned as shown in FIG. 19 and nozzle 423 shown in FIG. 23 aligned to the channel, fluid such as paint may be sprayed through the nozzle when the button 430 is depressed.

Figure 24:
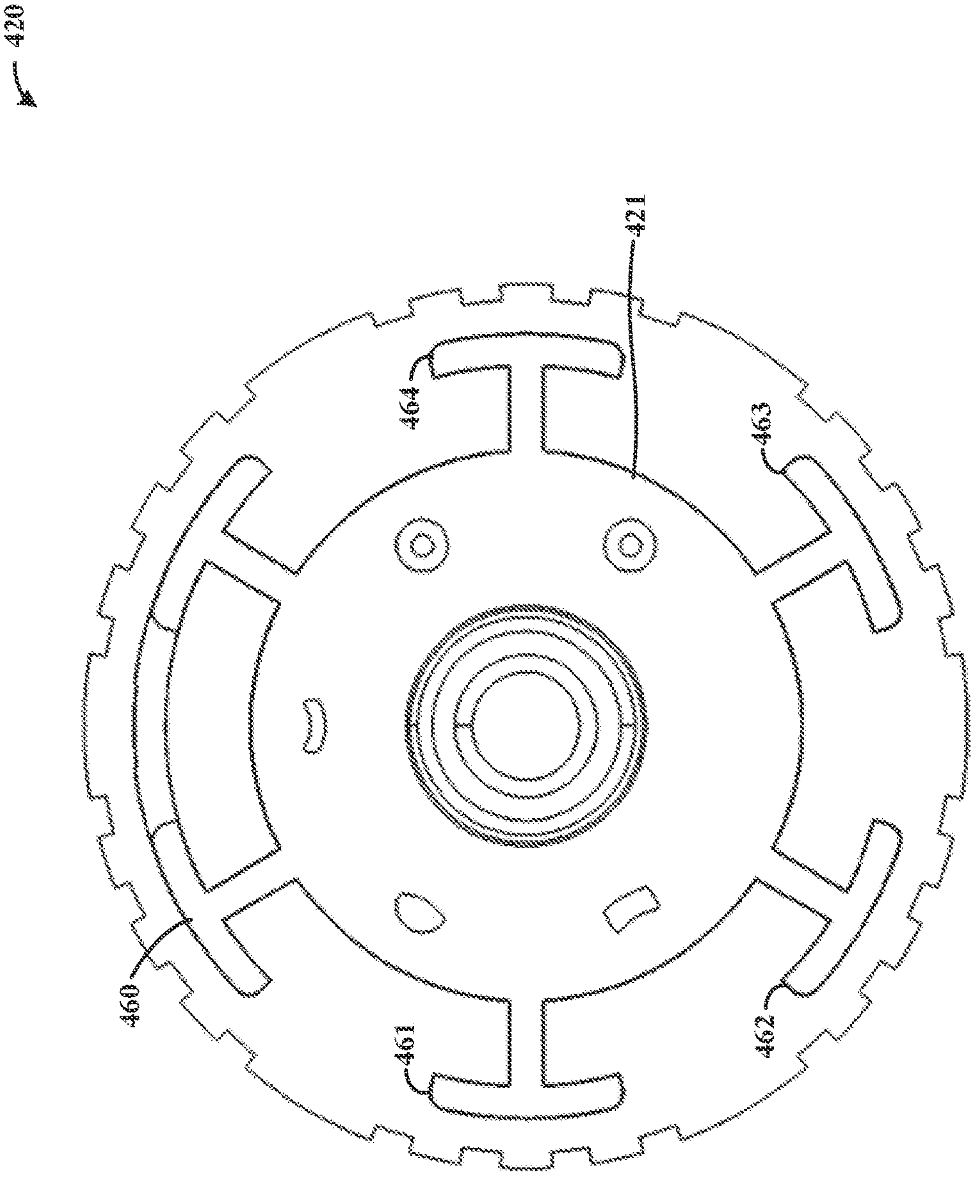
FIG. 24 shows a rear view of a rotatable dial with a locking mechanism, as may be implemented in accordance with one or more embodiments.

FIG. 24 shows a rear view of a rotatable dial 420 with a locking mechanism, as may be implemented in accordance with one or more embodiments. The locking mechanism includes a gear having cogs 460-464, and recessed regions between the cogs. The cogs 460-464 are configured to interact with a tooth or other structure to prevent downward movement of the dial 420 and, therein prevent liquid dispensing. For instance, when implemented with the embodiment shown in FIGS. 15 and 16, one of the cogs (e.g., 463) may be utilized to interact with tooth 450 in a manner as shown in FIG. 16 with the cog 463 of the gear 410 contacting the tooth. Similarly when implemented with the embodiment shown in FIGS. 19 and 20, the recessed region between cogs 462 and 463 may be aligned to tooth 450, allowing actuation of the rotatable dial 420 and dispensing of liquid. When implemented with the rotatable dial 420 of FIG. 23, the position of the dial 420 aligns nozzle 423 with channel 440 for spraying upon meshing of the region between the cogs 462 and 463 with tooth 450.

Figure 25:
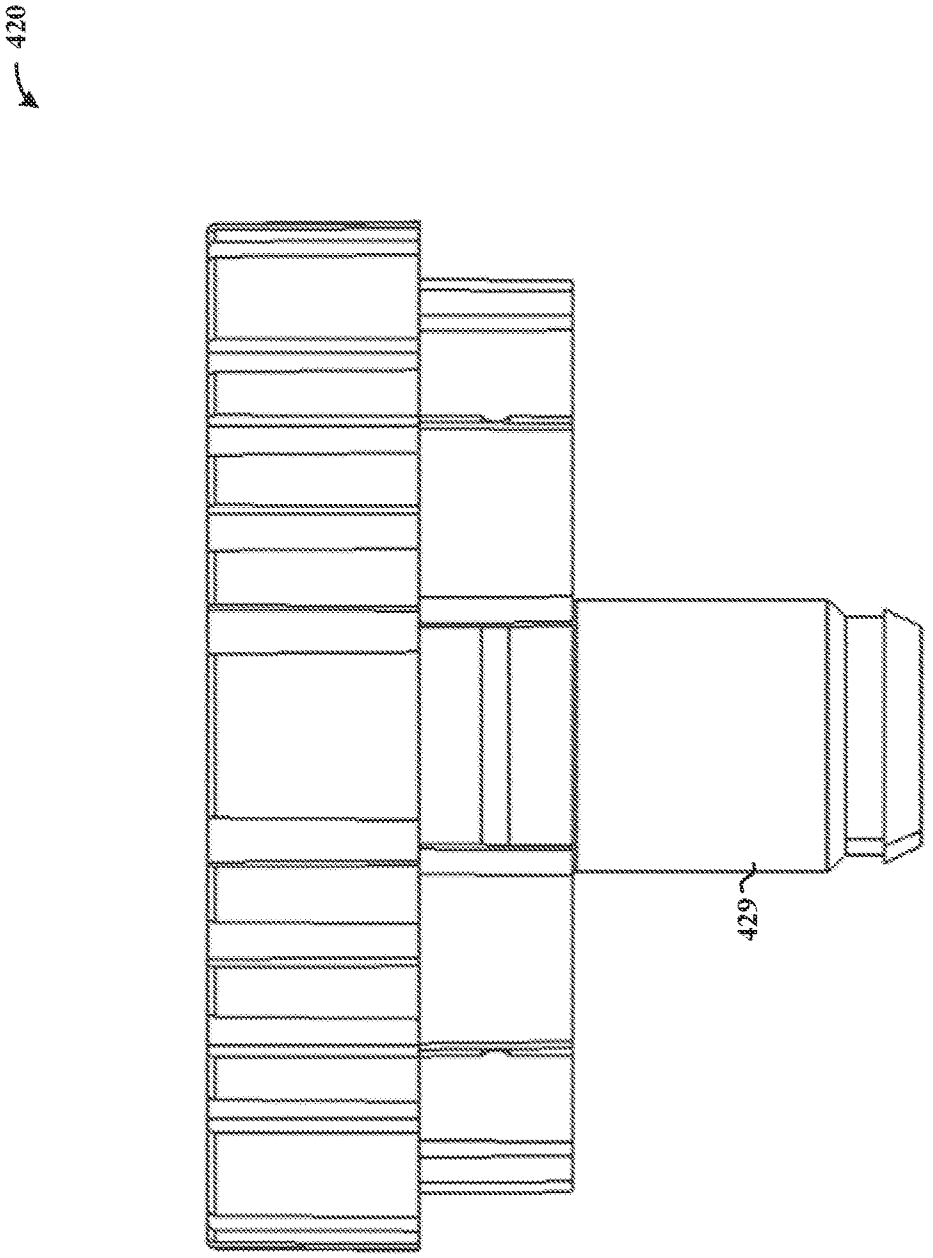
FIG. 25 shows a side view of a rotatable dial with multiple spray nozzles, as may be implemented in accordance with one or more embodiments.
Figure 26:
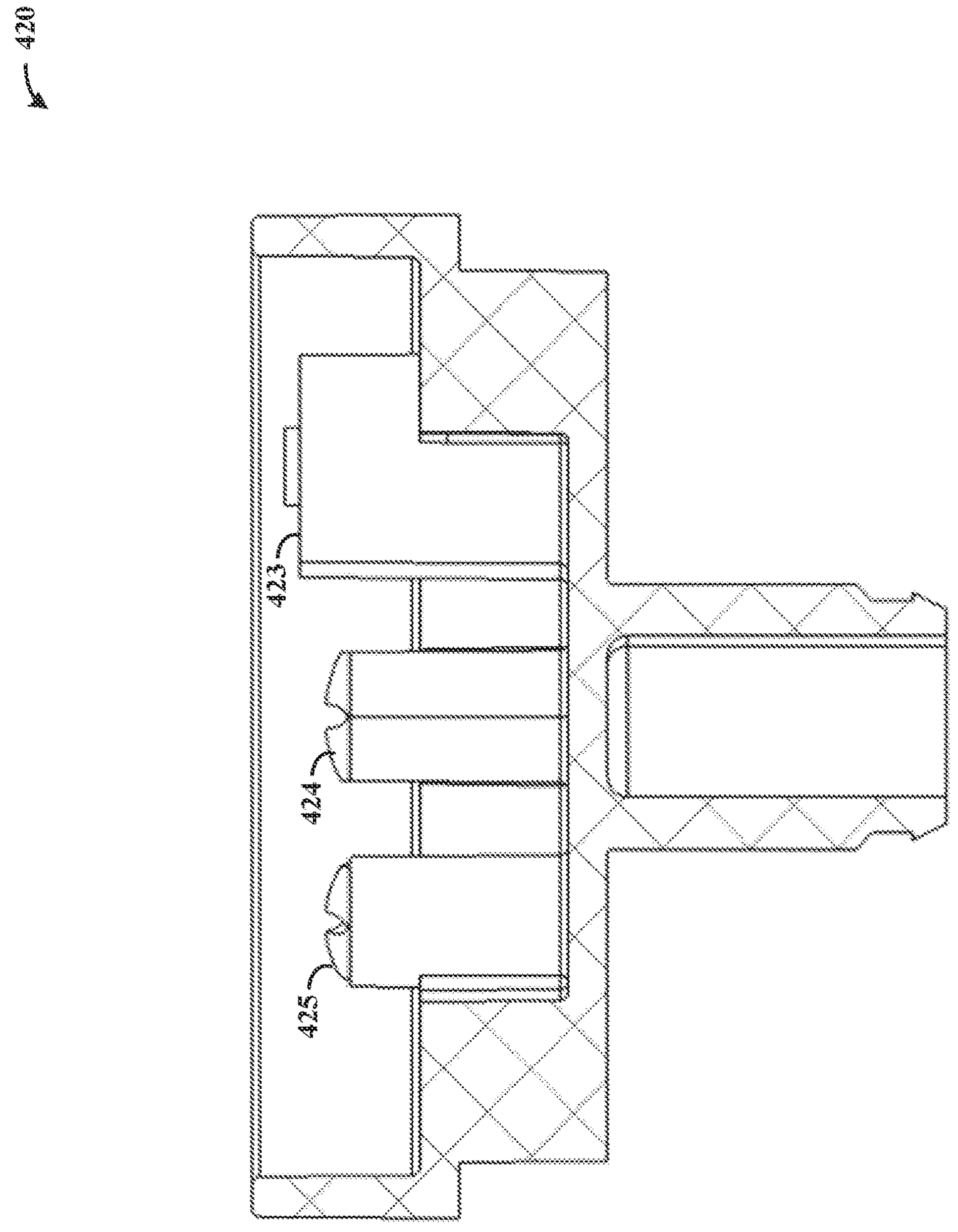
FIG. 26 shows a cross-sectional view of the rotatable dial shown in FIG. 25, as may be implemented with one or more embodiments.
Figure 27:
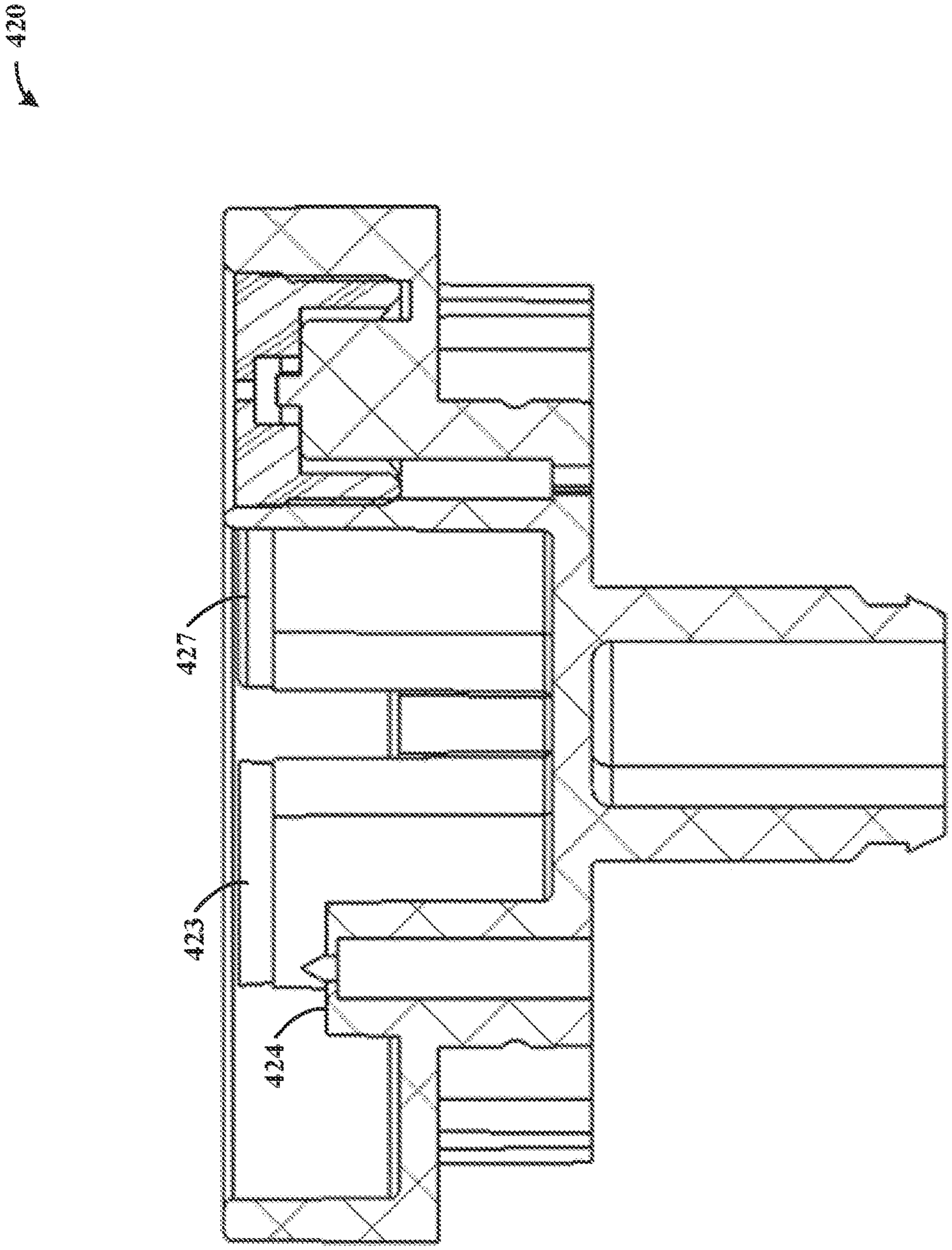

FIGS. 25-27 respectively show side and cross-sectional views of the rotatable dial 420 of FIG. 23, as may be implemented in accordance with one or more embodiments. The rotatable dial 420 has a shaft 429 configured for engaging with a sleeve (e.g., 441 of FIG. 15) for rotation of the rotatable dial 420 and alignment of the spray nozzles 423-427. FIGS. 26 and 27 show respective cross-sections with the nozzles revealed as noted. Each respective one of the spray nozzles 423-427 have channels operable for alignment for receiving propelled liquid upon depression of the button 430 in an unlocked position.

Based upon the above discussion and illustrations, those skilled in the art will readily recognize that various modifications and changes may be made to the various embodiments without strictly following the exemplary embodiments and applications illustrated and described herein. For example, the dials and related gears, actuator and mechanical stop may be utilized for a multitude of different types of dispensers and dispensing approaches, for a variety of materials. Further, the embodiments noted herein may be combined, and further embodiments may be separated (e.g., some embodiments are directed to a dial and stop as noted herein). Other shapes, such as an oblong shape, and other forms of rotation such as a truncated arc, may be utilized as well, with locking approaches as noted herein. Such modifications do not depart from the scope of various aspects of the invention, including aspects set forth in the claims.

What is claimed is:

1. An apparatus comprising:

a liquid supply channel;

a rotatable dial having a plurality of nozzles arranged about a surface of the rotatable dial in a common plane therewith and separated from one another by a portion of the rotatable dial, the rotatable dial being configured to selectively align each of the respective nozzles with the channel for receiving and spraying propelled liquid received via the channel in a common direction perpendicular to the common plane and the surface of the rotatable dial;

an actuator configured and arranged to release the propelled liquid into the channel by actuating a valve; and a locking mechanism including a gear coupled to rotate with the rotatable dial, the gear having cogs and recessed regions between the cogs, and configured with the rotatable dial to:

in response to the rotatable dial being positioned with the nozzles out of alignment with the channel, prevent actuation of the valve and block delivery of the propelled liquid to the channel by preventing movement of the actuator; and in response to the rotatable dial being positioned with one of the nozzles aligned with the channel, facilitate movement of the actuator for actuating the valve and delivering the propelled liquid to the one of the nozzles via the channel.

2. The apparatus of claim 1, wherein the actuator includes a button mechanism configured and arranged to open the valve in response to depression of the button while the rotatable dial is positioned such that one of the nozzles is aligned with the channel and the locking mechanism facilitates the movement of the actuator.

3. The apparatus of claim 2, wherein the button mechanism, dial and channel are coupled and move together in response to depression of the button.

4. The apparatus of claim 3, including a pivot structure coupled to the button mechanism, the pivot structure being configured to facilitate the movement of the actuator by pivoting the button mechanism about the pivot structure and therein depressing the dial and channel for delivering propelled liquid via one of the nozzles.

5. The apparatus of claim 4, wherein:

the locking mechanism includes a mechanical stop; and the recessed regions between the cogs are located relative to the nozzles and the mechanical stop such that, when the rotatable dial is positioned with the nozzles out of alignment with the channel, one of the cogs is aligned to the mechanical stop and prevents the button from pivoting to actuate the valve; and when the rotatable dial is positioned with one of the nozzles aligned with the channel, one of the recessed regions is aligned to and configured to mesh with the mechanical stop, therein allowing the button to pivot about the pivot structure and depress the dial and channel to actuate the valve and deliver the propelled liquid to the one of the nozzles via the channel.

6. The apparatus of claim 5, wherein the cogs include a cog corresponding to each space between adjacent ones of the nozzles such that:

one of the cogs is aligned to the mechanical stop at all instances in which space between any adjacent ones of the nozzles is aligned to the channel; and one of the recessed regions is aligned to mesh with the mechanical stop for allowing movement of the button for actuating the valve at all instances in which one of the nozzles is aligned to the channel.

7. The apparatus of claim 5, wherein the dial includes the gear.

8. The apparatus of claim 1, wherein the locking mechanism includes a mechanical stop; and the cogs and recessed regions between the cogs are located relative to the nozzles and the mechanical stop such that, when the rotatable dial is positioned with the nozzles out of alignment with the channel, one of the cogs is aligned to the mechanical stop and prevents movement of the actuator and actuation of the valve; and when the rotatable dial is positioned with one of the nozzles aligned with the channel, one of the recessed regions is aligned to and configured to mesh with the mechanical stop, therein allowing movement of the actuator for actuating the valve and delivering the propelled liquid to the one of the nozzles via the channel.

9. The apparatus of claim 1, wherein the locking mechanism includes a mechanical stop, and the gear is configured with the mechanical stop to prevent actuation of the actuator when the nozzles are not aligned to the channel.

10. The apparatus of claim 9, wherein:

the gear includes a recessed region configured to mesh with the mechanical stop; and the locking mechanism includes a pivot arm coupled to the actuator, the pivot arm being configured and arranged with the gear to actuate the valve when the recessed region is meshed with the mechanical stop.

11. The apparatus of claim 1, further including the valve and a container coupled to the valve and containing a liquid, wherein:

the liquid supply channel, rotatable dial, actuator and locking mechanism are part of a cap coupled to the container; and the cap is configured to spray liquid from the container through said one of the nozzles in response to the actuator being depressed and said one of the nozzles being aligned to the channel, by actuating the valve and therein causing the container to propel liquid through the valve, channel and nozzle.

12. The apparatus of claim 1, wherein the actuator includes a button coupled to a pivot and configured and arranged to actuate the valve in response to force applied to the button that causes the button to pivot and depress the channel, dial and valve vertically for dispensing the propelled liquid when the rotatable dial is positioned with one of the nozzles aligned with the channel.

13. The apparatus of claim 1, wherein the channel, dial and actuator are coupled to a pivot and are configured and arranged to actuate the valve in response to force applied to the actuator that causes the channel, dial and actuator to rotate about the pivot when the rotatable dial is positioned with one of the nozzles aligned with the channel.

14. An apparatus comprising:

a channel;

an actuator;

a mechanical stop; and a dial having a surface and:

a plurality of nozzles in the surface and aligned in a common plane with the surface to spray fluid in a common direction perpendicular to the surface and the common plane, the dial being configured to rotate for selectively aligning each of the respective nozzles with the channel; and a gear having a plurality of cogs and recessed regions between adjacent ones of the cogs, the gear being configured and arranged with the mechanical stop to prevent movement of the actuator when the dial is positioned with the nozzles out of alignment with the channel.

15. The apparatus of claim 14, wherein the cogs are aligned relative to the nozzles such that:

when one of the nozzles is aligned to the channel, one of the recessed regions is aligned to mesh with the mechanical stop and therein facilitate movement of the actuator; and when none of the nozzles are aligned to the channel, one of the cogs is aligned to engage with the mechanical stop and therein prevent movement of the actuator.

16. The apparatus of claim 14, further including:

a container configured to contain fluid; and a valve coupled to the actuator and configured and arranged to dispense the fluid from the container into the channel in response to movement of the actuator.

17. The apparatus of claim 14, wherein the gear is configured and arranged to mesh one of the recessed regions with the mechanical stop to facilitate movement of the actuator when the dial is positioned with one of the nozzles aligned with the channel.

18. The apparatus of claim 14, wherein the actuator includes a pivot arm coupled to a pivot point, the pivot arm being configured to pivot about the pivot point in response to pressure applied to the actuator when one of the recessed regions is aligned to mesh with the mechanical stop.

19. The apparatus of claim 18, wherein the actuator includes a button configured and arranged with the dial to, in response to pressure applied to the button, pivot about the pivot point and apply downward pressure that causes the dial to actuate vertically.

20. The apparatus of claim 14, wherein:

the dial is configured to selectively align each of the respective nozzles with the channel for receiving and spraying propelled liquid received via the channel;

the actuator is configured and arranged to release the propelled liquid into the channel by actuating a valve; and the gear and mechanical stop form a locking mechanism configured with the dial to:

in response to the dial being positioned with the nozzles out of alignment with the channel, prevent actuation of the valve and block delivery of the propelled liquid to the channel by preventing movement of the actuator; and in response to the dial being positioned with one of the nozzles aligned with the channel, facilitate movement of the actuator for actuating the valve and delivering the propelled liquid to the one of the nozzles via the channel.

* * * * *